(12) United States Patent
Konyndyk et al.

(10) Patent No.: US 10,676,211 B2
(45) Date of Patent: Jun. 9, 2020

(54) REMOTE OPTICAL CONTROL SURFACE INDICATION SYSTEM

(71) Applicant: The Boeing Company, Chicago, IL (US)

(72) Inventors: David M. Konyndyk, Shoreline, WA (US); Jerry A. James, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/591,380

(22) Filed: Oct. 2, 2019

(65) Prior Publication Data
US 2020/0031492 A1   Jan. 30, 2020

Related U.S. Application Data

(62) Division of application No. 15/407,076, filed on Jan. 16, 2017, now Pat. No. 10,435,173.

(51) Int. Cl.
*B64D 45/00* (2006.01)
*H04N 5/225* (2006.01)
*H04N 5/33* (2006.01)
*B64D 47/08* (2006.01)

(52) U.S. Cl.
CPC ....... *B64D 45/0005* (2013.01); *H04N 5/2252* (2013.01); *H04N 5/2256* (2013.01); *B64D 47/08* (2013.01); *H04N 5/33* (2013.01)

(58) Field of Classification Search
CPC .. B64D 45/0005; B64D 47/08; H04N 5/2256; H04N 5/2252; H04N 5/33
See application file for complete search history.

(56) References Cited

U.S. PATENT DOCUMENTS

| | | | | |
|---|---|---|---|---|
| 5,820,116 A | * | 10/1998 | Haese | B25B 5/006 269/21 |
| 7,380,759 B1 | * | 6/2008 | Whiteside | B60R 11/02 248/183.1 |
| 8,286,360 B1 | * | 10/2012 | Murray | G01C 9/02 33/347 |
| 8,827,222 B2 | * | 9/2014 | Jacobson | F16M 13/02 248/205.5 |
| 9,091,294 B2 | * | 7/2015 | Zhang | F16B 47/00 |

(Continued)

*Primary Examiner* — James M Pontius
(74) *Attorney, Agent, or Firm* — Ostrager Chong Flaherty & Broitman, P.C.

(57) ABSTRACT

A remote optical control surface indication system comprising mechanisms configured to engage heads of respective fasteners that attach an alignment indexing plate to a vehicular structure having a control surface coupled thereto. The system further comprises: a camera having a field of view that encompasses a portion of an end face of the control surface when the mechanisms are engaged with the fasteners and when the control surface is in a neutral position; a source of light that is activatable to project light that illuminates the end face of the control surface; a display screen comprising an array of pixels; and a computing system configured to process image data captured by the camera to determine a current position of a centerline of the end face of the control surface relative to a baseline position and control the display screen to display symbology indicating the current position relative to the baseline position.

20 Claims, 19 Drawing Sheets

(56) References Cited

U.S. PATENT DOCUMENTS

| | | | | |
|---|---|---|---|---|
| 2005/0022399 A1* | 2/2005 | Wheeler | ............... | G01C 15/002 33/286 |
| 2006/0185181 A1* | 8/2006 | Long | .................... | G01C 15/002 33/286 |
| 2007/0011894 A1* | 1/2007 | Chen | .................... | G01C 15/004 33/286 |
| 2010/0108817 A1* | 5/2010 | Fox, Jr. | ................ | B64D 17/383 244/142 |
| 2011/0210225 A1* | 9/2011 | Chen | .................... | F16B 47/006 248/363 |
| 2012/0068852 A1* | 3/2012 | Sergyeyenko | ............ | B25F 1/02 340/689 |

* cited by examiner

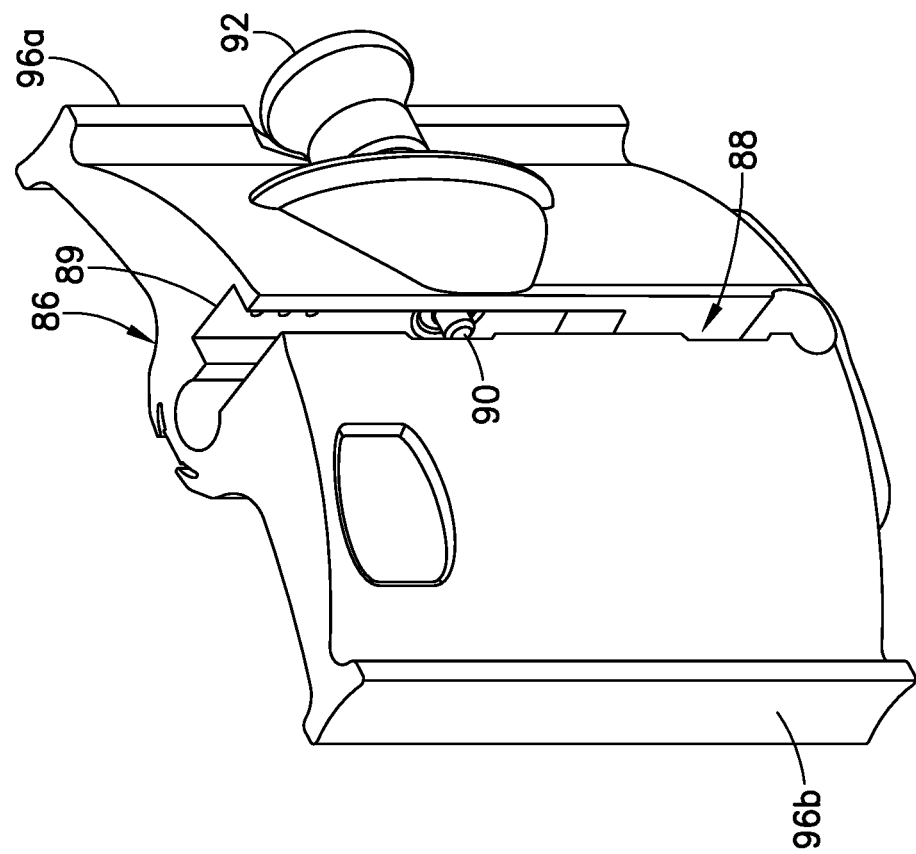
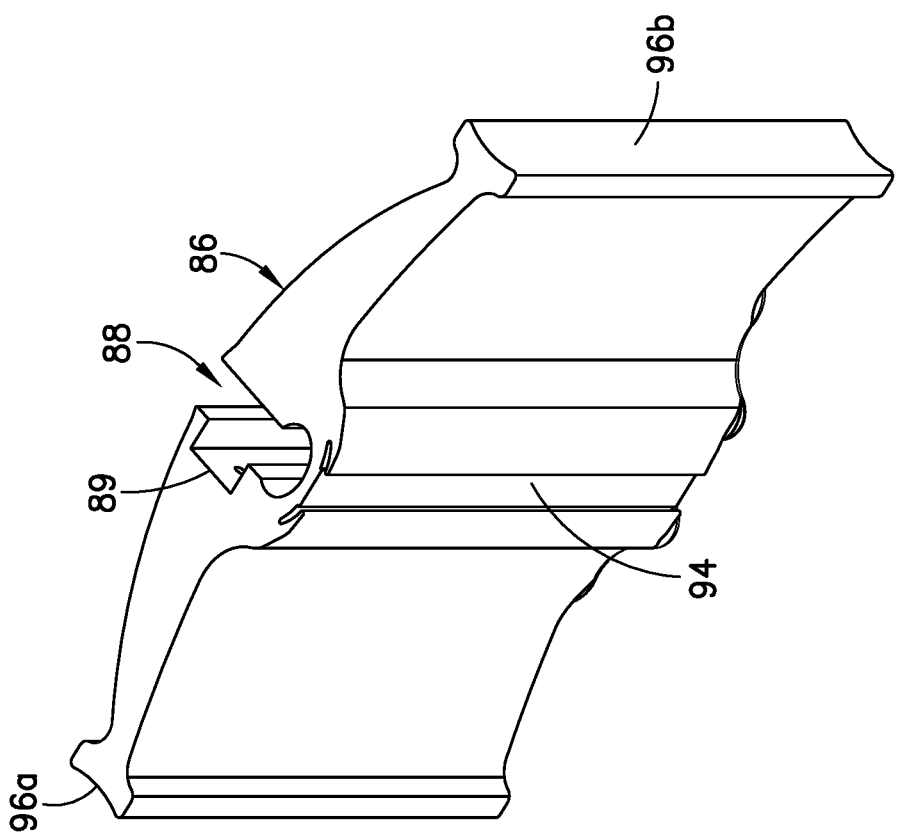

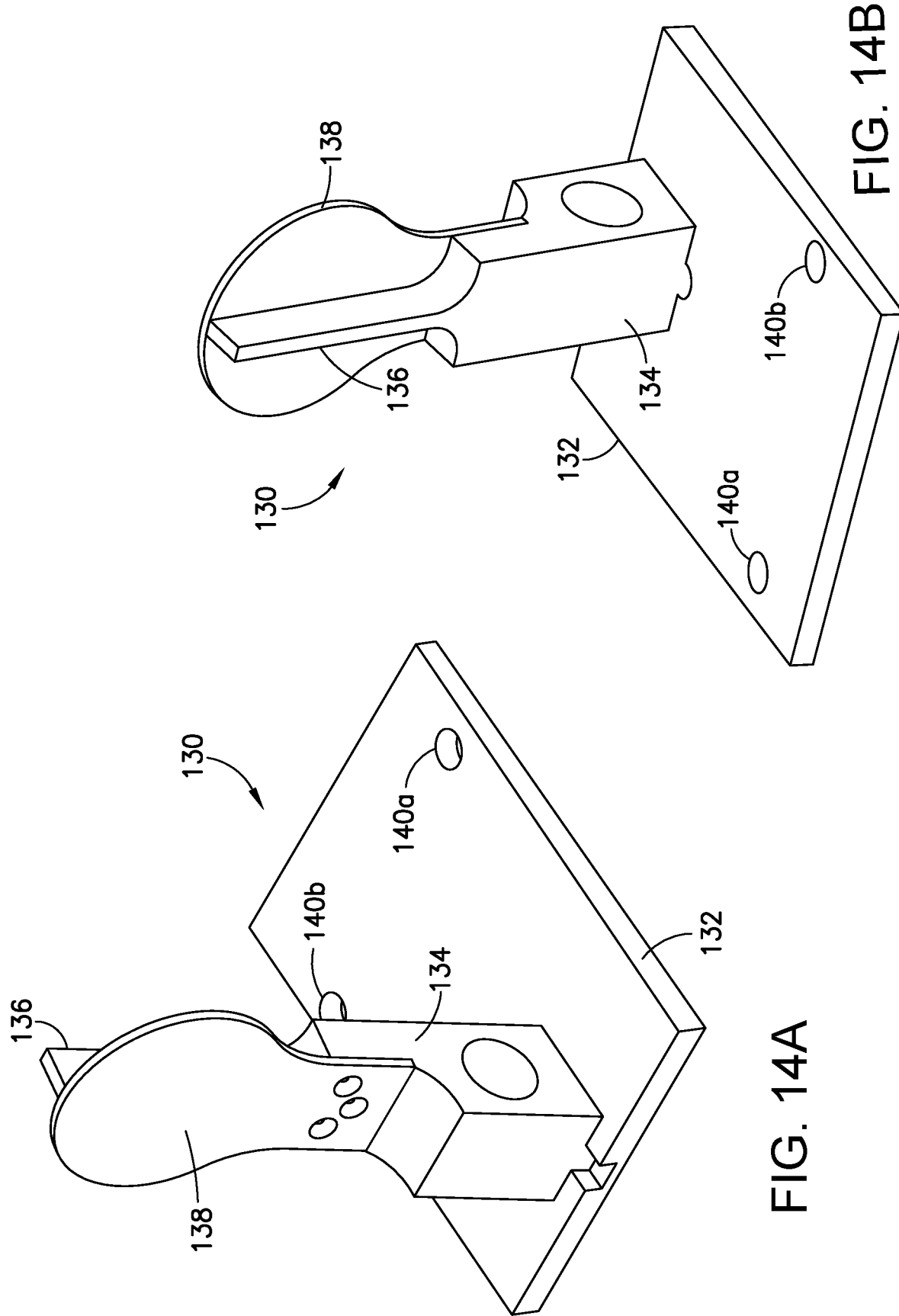

REMOTE OPTICAL CONTROL SURFACE INDICATION SYSTEM

RELATED PATENT APPLICATION

This application is a divisional of and claims priority from U.S. patent application Ser. No. 15/407,076 filed on Jan. 16, 2017, which issued as U.S. Pat. No. 10,435,173 on Oct. 8, 2019).

BACKGROUND

The technology disclosed herein relates generally to systems and methods for calibrating steering devices to vehicle operator controls and, more specifically, to rigging fluid control bodies to vehicle operator controls.

Fluid dynamics includes the disciplines of aerodynamics and hydrodynamics to optimize fluid flow across control surfaces of a vehicle. The control surfaces are precisely moved by the operator during vehicle movement to create steering forces to direct the vehicle in a designated path and provide stability during travel. For example, a rudder may be adjusted to steer an aircraft or an elevator on a wing may be positioned to stabilize lift forces. Complex three-dimensional shapes are often used as control surfaces to optimize fuel consumption and provide effective operation. These shapes in combination with the other surfaces determine vehicle performance characteristics.

Various rigging methods to calibrate control surfaces and related systems are known. A pivotable control surface (e.g., a rudder, an elevator, an aileron or a flaperon) may steer a vehicle (e.g., an aircraft). Deviations of the control surface shape may distort a relationship between the vehicle controls and the control surface. Calibration restores the relationship by establishing an alignment feature as part of the control surface which may be aligned to a rigging point on the vehicle associated with a known control setting. A metrology device and/or computer software may be used for calibration. The metrology device may define a positional relationship between a reference surface (e.g., an alignment indexing plate comprising a plurality of linear measurement markings) on the vehicle, a rotational axis of the control surface, and a target location (e.g., neutral position) of the alignment feature. By manipulating the control surface to a target relationship relative to the reference surface, the location of the alignment feature on the control surface may be calibrated relative to the operator controls. In this manner, the operator controls may be rigged to accurately reflect the true position of the control surface to improve vehicular performance.

Current tooling for rudder rigging on some aircraft can present concerns with respect to ensuring the accuracy of testing and the safety of aircraft and personnel. There is a need for a system and method that would enable a user to measure the position of a rudder or other control surface for rigging by non-contact means.

SUMMARY

The subject matter disclosed in detail below is directed to remote optical control surface indication systems for rigging control surfaces of vehicles such as aircraft. In accordance with some embodiments, the system comprises an infrared camera tracking device having an onboard graphical user interface that can also be accessed remotely via a handheld unit. The system may be expanded to include position indicators for multiple control surfaces. The system's optical components are selected to enable indication of the linear position of a flight control surface to a specified accuracy. Optionally, the system may be programmed with an adaptive optics subroutine which allows it to function in various lighting conditions.

In accordance with one embodiment, the remote optical control surface indication system comprises a tracking device having an onboard graphical user interface for displaying measurement results. A maintenance technician will be able to read the measurement results from more than five feet away by means of an onboard graphical user interface in the form of a unit-mounted liquid crystal display (LCD) screen. This tracking device will remove the human factor from the measurement results and provide improved accuracy.

In accordance with another embodiment, the remote optical control surface indication system described in the preceding paragraph further comprises a handheld unit in the form of a wireless digital readout for remote access to the same measurement results.

In one application, the optical indication system is designed for use in calibrating the zero position of a rudder of an aircraft to corresponding positions of rudder pedals used by the pilot to control the direction (left or right) of yaw about the airplane's vertical axis for minor adjustments. This optical indication system does not contact the moving rudder and will seat securely on the empennage, indexing to an alignment indexing plate.

The remote optical control surface indication system disclosed in detail below enhances safety and ergonomics. In particular, the system disclosed herein eliminates the potential for a tool to fall from the control surface and allow the maintenance technician to operate at a safer distance from the active control surface without the need for extra safety equipment. In addition, the amount of labor would be reduced because use of a wireless indication would allow one technician to rig remotely from the flight deck or from automated test equipment (i.e., a workstation comprising a computer that interfaces with the computers onboard the aircraft). Faster setup speed and real-time indicator readout will reduce test times to some extent. The system disclosed in detail below would also eliminate the need for a laptop and a stick-mounted webcam.

One aspect of the subject matter disclosed in detail below a remote optical control surface indication system comprises a tracking device and a handheld unit which communicate with each other. The tracking device comprises: first and second mechanisms configured to respectively engage first and second features on a vehicular structure having a control surface movably coupled thereto; a camera having a field of view that encompasses a portion of an end face of the control surface when the mechanisms are engaged with the features and when the control surface is in a neutral position; a source of light that is activatable to project light that illuminates the end face of the control surface; a display screen comprising an array of pixels; and a computing system configured to: (1) process image data captured by the camera to determine a current position of a control surface relative to a neutral position; and (2) control the display screen to display symbology indicating the current position relative to the neutral position. The handheld unit also comprises a computing system and a display screen. In accordance with some embodiments, the handheld unit displays symbology indicating the current position of the control surface relative to its neutral position based on information received from the tracking device.

Another aspect of the subject matter disclosed in detail below is an optical control surface indication system comprising: a base assembly comprising a base plate and first and second mechanisms (e.g., respective spring-loaded plunger cups) configured to respectively engage first and second features on a vehicular structure having a control surface movably coupled thereto; a camera having a field of view that encompasses a portion of an end face of the control surface when the first and second mechanisms are engaged with the first and second features and when the control surface is in a neutral position; a source of light that is activatable to project light that illuminates at least a portion of the end face of the control surface; a first display screen comprising an array of pixels; and a first computing system configured to perform the following operations: (a) processing image data captured by the camera to determine a current position of the control surface relative to a neutral position of the control surface; and (b) controlling the first display screen to display symbology indicating the current position of the control surface relative to the neutral position of the control surface.

In one application, the vehicular structure is an aircraft fuselage, the first and second features are respective fastener heads, the control surface is a rudder, and the end face is a trailing edge. In accordance with one embodiment of the system, the source of light comprises a multiplicity of infrared light-emitting diodes and the camera is an infrared camera.

In one implementation, the symbology comprises a graphical representation of an aircraft butt line marking corresponding to a baseline position of a centerline of the end face when the control surface is in its neutral position and a movable indicator separated from the graphical representation of the aircraft butt line marking by a distance proportional to the distance separating the current position of the centerline from its baseline position. In another implementation, the symbology comprises a plurality of alphanumeric characters representing an offset of the current position of a centerline of the end face of the control surface relative to a baseline position of the centerline corresponding to the neutral position of the control surface.

In accordance with some embodiments, the first computing system is further configured to adapt the processing of image data to lighting conditions. In accordance with other embodiments, the optical control surface indication system further comprises an optical target mounted to the control surface, the optical target comprising a reflector and a pair of wings made of opaque material disposed on opposite sides of the reflector.

A further aspect of the subject matter disclosed in detail below is a method for indicating a position of a control surface that is coupled to a vehicular structure relative to a neutral position of the control surface, comprising: placing a reflective target on a portion of an end face of the control surface; locating a camera at a known position relative to the neutral position of the control surface and oriented so that a field of view of the camera encompasses the reflective target; projecting light that illuminates the reflective target; acquiring image data representing an image of the reflective target; processing the image data to determine a current position of the control surface relative to the neutral position of the control surface; and displaying symbology indicating the current position of the control surface relative to its neutral position. In accordance with one embodiment of the method, processing the image data comprises detecting first and second edges of the reflective target and then calculating first and second positions of the first and second edges of the reflective target respectively, the current position of the centerline of the end face of the control surface being midway between the first and second positions.

Yet another aspect of the subject matter disclosed in detail below is an optical indication system comprising: a base assembly comprising a base plate and first and second spring-loaded plunger cups; a multiplicity of infrared light-emitting diodes which are activatable to project infrared light; an infrared camera located to detect a returned portion of the projected infrared light; a first display screen comprising an array of pixels; and a first computing system configured to perform the following operations: (a) detecting first and second edges of the returned portion of the projected infrared light; (b) calculating first and second positions of the first and second edges respectively relative to a frame of reference of the optical indication system; (c) calculating a midway position between the first and second positions; and (d) controlling the first display screen to display symbology indicating the midway position relative to the frame of reference of the optical indication system. The optical indication system may further comprise: a first transceiver and a first wireless communication interface that allows the first computing system to communicate with the first transceiver; and a handheld unit comprising a second computing system, a second transceiver, a second wireless communication interface that allows the second computing system to communicate with the second transceiver, and a second display screen comprising an array of pixels. The second computing system is configured to control the second display screen to display symbology indicating the midway position relative to the frame of reference based on information received by the second transceiver from the first transceiver.

A further aspect of the subject matter disclosed in detail below is a tool assembly comprising an electrical tool and a tool platform that carries the electrical tool, wherein the tool platform comprises: a base plate having first and second openings; first and second support members attached to the base plate, each of the first and second support members comprising a first portion disposed in the first and second openings in the base plate respectively and having a bore; first and second magnets attached to respective second portions of the first and second support members; first and second plunger cups movable between first and second axial positions in the bore of the respective first portion of the first and second support members; first and second mounting plates made of ferromagnetic material and having respective portions configured to abut the first and second magnets; first and second suction cups attached to the first and second mounting plates respectively; and first and second lanyards each having one end coupled to a respective one of the first and second mounting plates and another end coupled to the base plate.

Yet another aspect is an attachable optical target comprising a central portion supporting a strip of infrared-reflecting diffusive tape, first and second wings integrally formed with and disposed on opposite sides of said central portion, and a retractable spring plunger, wherein the central portions and first and second wings define a main channel and a rectangular channel in communication with one side of the main channel, further comprising a clamp arm disposed in the rectangular channel, wherein a tip of the retractable spring plunger urges the clamp arm toward an opposite side of the main channel.

Other aspects of remote optical control surface indication systems and methods are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 13A and 13B are diagrams representing different isometric views of an optical target that can be placed on the trailing edge of a rudder.

FIGS. 14A and 14B are diagrams representing different isometric views of a calibration jig that can be used to calibrate the tracking device depicted in FIG. 4.

Reference will hereinafter be made to the drawings in which similar elements in different drawings bear the same reference numerals.

DETAILED DESCRIPTION

Illustrative embodiments of a remote optical control surface indication system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The movement of an aircraft in different directions may be controlled using flight control surfaces. For example, flight control surfaces may be used to rotate an aircraft to change pitch, roll and yaw of the aircraft. Additionally, flight control surfaces also may be used to change the coefficient of lift of wings on an aircraft. A flight control surface may be, for example, without limitation, an aileron, an elevator, a rudder, a spoiler, a flap, a slat, an airbrake, an elevator trim, or some other suitable type of control surface.

In accordance with the terminology used herein, the tail assembly (i.e., empennage) of an aircraft comprises a tailfin (i.e., a fixed vertical stabilizer and a pivotable rudder), a tailplane (i.e., a fixed horizontal stabilizer and pivotable elevators), and the part of the fuselage to which these are attached. Typically the empennage is the portion of the aircraft disposed behind the rear pressure bulkhead.

Figure 1:
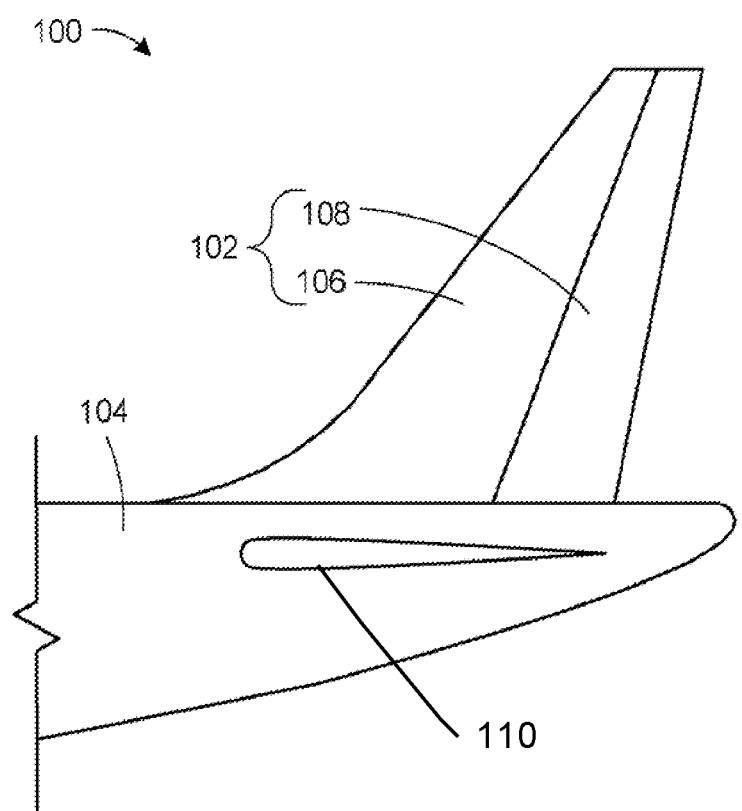
FIG. 1 is a diagram representing a side view of an empennage of a typical aircraft.

FIG. 1 shows the structure of a typical empennage 100 of an aircraft. This typical empennage 100 comprises a vertical tailfin 102 comprising a fixed front section called the vertical stabilizer 106, used to restrict side-to-side motion of the aircraft (yawing). The vertical stabilizer 106 is attached to the top of a rear fuselage portion 104. The rear section of the vertical tailfin 102 typically has a rudder 108 pivotably coupled thereto by hinges. The rudder 108 is rotatable to provide the appropriate yawing force according to a corresponding deflection angle.

The typical empennage 100 further comprises a horizontal stabilizer 110, which is used to provide pitch stability. The rear section of the horizontal stabilizer typically has elevators (not shown in FIG. 1) pivotably coupled thereto by hinges. An elevator is a movable airfoil-shaped body that controls changes in pitch, i.e., the up-and-down motion of the aircraft's nose.

Various rigging methods may be employed to calibrate the rudder 108 relative to the rudder controls operated by the aircraft pilot. Calibration establishes the correct relationship by aligning a feature of the rudder (e.g., a centerline) with a feature (e.g., an alignment indexing plate comprising a plurality of linear measurement markings) on the rear fuselage portion 104. By rotating the rudder to a target relationship relative to the fuselage, the location of the rudder feature may be calibrated relative to the rudder controls. In this manner, the rudder controls may be rigged to accurately reflect the true position of the rudder to improve aircraft performance.

Figure 2:
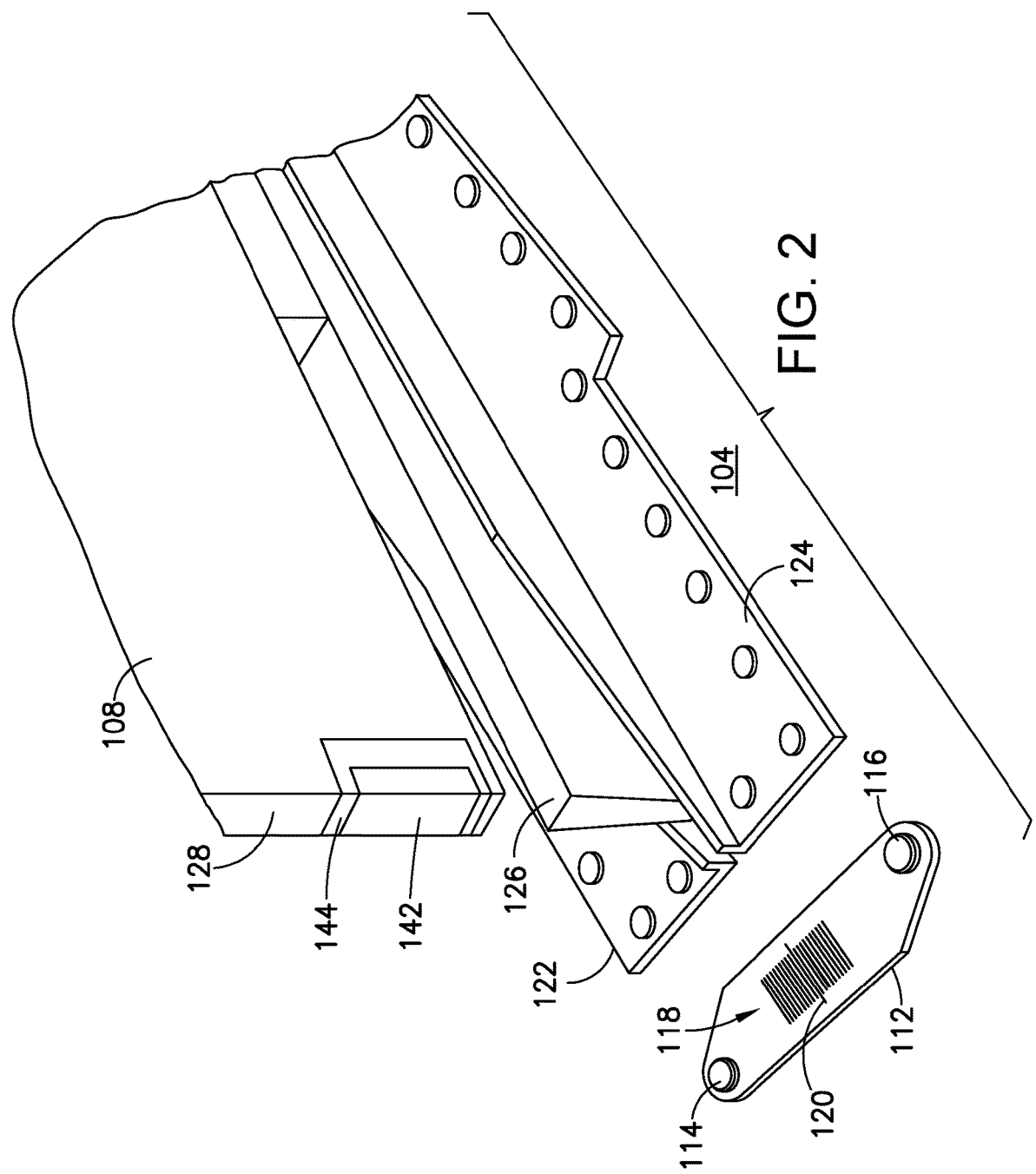
FIG. 2 is a diagram representing an isometric view of a portion of an empennage having an alignment indexing plate attached to the fuselage.

FIG. 2 represents an isometric view of a portion of an empennage having an alignment indexing plate 112 attached to the top of the rear fuselage portion 104 aft of the vertical tail assembly. The vertical tail assembly comprises a vertical stabilizer fairing 126 attached to the rear fuselage portion 104 by a pair of L-beams 122 and 124 and disposed directly below the rudder 108 when the latter is in its neutral position, i.e., a deflection angle of zero degrees. The rudder 108 has a large bulb seal (not shown in FIG. 2) mounted underneath which rides on top of the vertical stabilizer fairing 126 for aerodynamic purposes.

The alignment indexing plate 112 is attached at a specified position relative to the vertical stabilizer fairing 126 using a pair of indexing plate fasteners 114 and 116. The indexing plate fasteners 114 and 116 are considered reference geometry on the aircraft and are precisely located. The alignment indexing plate 112 has a plurality of linear measurement markings 118 thereon which are spaced apart at equal intervals in the manner of a ruler. The alignment indexing plate 112 is positioned relative to the vertical stabilizer fairing 126 such that a centerline of the rudder 108 will be aligned with an aircraft butt line marking 120 of the plurality of linear measurement markings 118 when the rudder 108 is in its neutral position.

One known rudder rigging tool is a heavy block of aluminum (not shown in FIG. 2) that is clamped onto the trailing edge 128 of the rudder 108. The block has a steel pin (not shown) which points to the alignment indexing plate 112. The rudder can be properly calibrated when the point of the steel pin overlies the aircraft butt line marking 120 on the alignment indexing plate 112. This technique may present a potential for observational error beyond the design requirement. In addition, the known rudder rigging tool must be read at a close distance. This requires a maintenance technician to spend time acquiring and setting up a laptop and webcam system in order to comply with a five-foot hazardous energy rule with regard to active control surfaces. The rudder rigging tool then remains attached while the rudder is swung in factory testing, presenting a potential risk of detachment.

In accordance with the rudder rigging technique disclosed herein, an optical indication system indicates the position of a rudder 108 that has an optical target on the trailing edge 128. In accordance with one embodiment depicted in FIG. 2, that optical target may take the form of a reflective tape 142 adhered to an underlying contact tape 144 that is approved by the factory for contact with the skin of the rudder 108.

Figure 3:
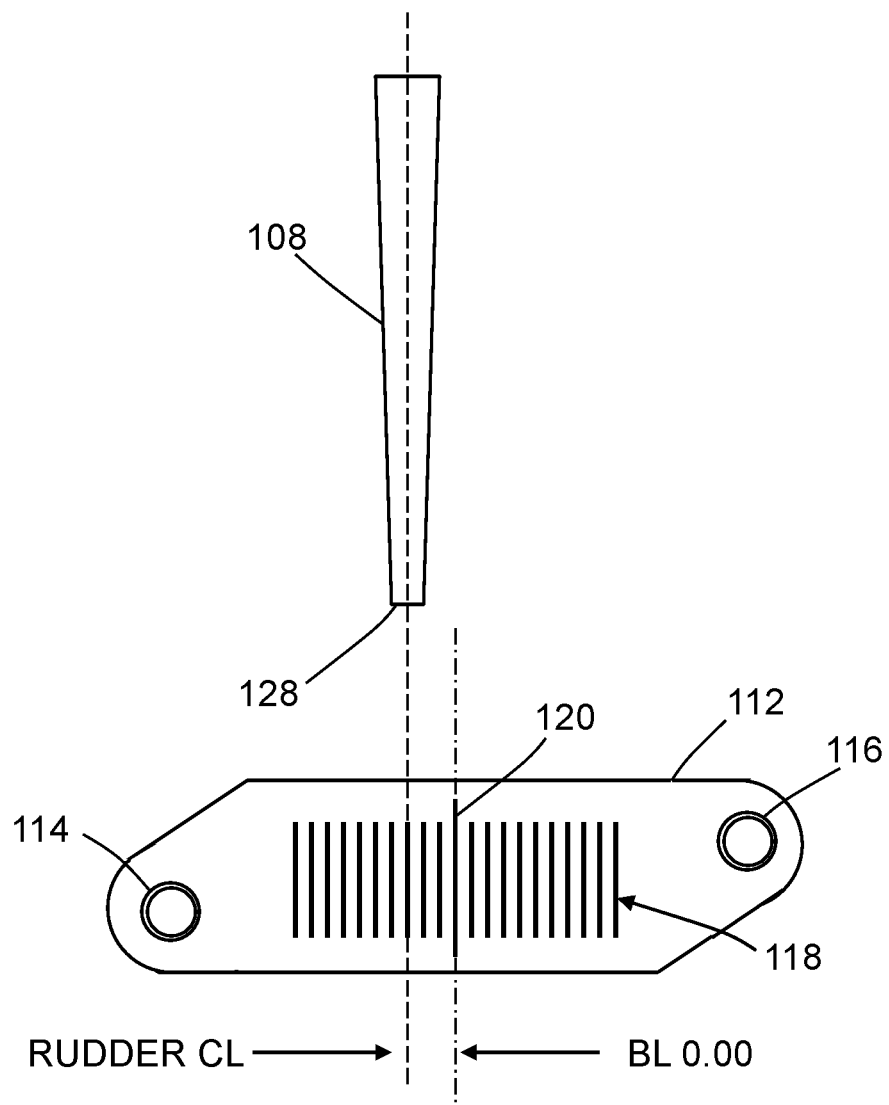
FIG. 3 is a diagram representing a top view of a rudder having a non-neutral position relative to an alignment indexing plate attached to the fuselage.

FIG. 3 represents a top view of a rudder 108 having a non-neutral position relative to an alignment indexing plate 112 attached to the rear fuselage portion 104. Specifically, the dashed line labeled RUDDER CL in FIG. 3 indicates the position of the centerline of the rudder 108 relative to the position of the aircraft butt line marking 120, which position is represented by the dashed—dotted line labeled BL 0.00. This linear position of the rudder centerline in relation to the aircraft butt line is used as an approximation of the angular deflection of the rudder at small angles close to the neutral position at BL 0.00. When the centerline of rudder 108 aligns with the aircraft butt line marking 120 during a rudder rigging operation, the maintenance technician on the flight deck can calibrate the rudder controls to indicate that the rudder has a deflection angle of zero degrees.

This disclosure proposes to solve one or more of the problems described above using a remote optical control surface indication system comprising a tracking device having an onboard graphical user interface for displaying measurement results, which results can be viewed by the maintenance technician from a distance further away from the trailing edge 128 of the rudder 108 than is the case with a currently employed rudder rigging method. The maintenance technician will be able to read the measurement results from more than five feet away by means of an onboard graphical user interface in the form of a unit-mounted liquid crystal display (LCD) screen. This tracking device will remove the human factor from the measurement results and provide improved accuracy.

One embodiment of such a tracking device will now be described in detail with reference to FIGS. 4-7. The tracking device 10 depicted in FIGS. 4-7 eliminates the potential for a tool to fall from the rudder 108 and allows the maintenance technician to operate at a safer distance from the active rudder surface without the need for extra safety equipment. In addition, the amount of labor would be reduced because use of a wireless indication would allow one technician to rig remotely from the flight deck or from automated test equipment (i.e., a workstation comprising a computer that interfaces with the computers onboard the aircraft). Faster setup speed and real-time indicator readout will reduce test times to some extent.

Figure 4:
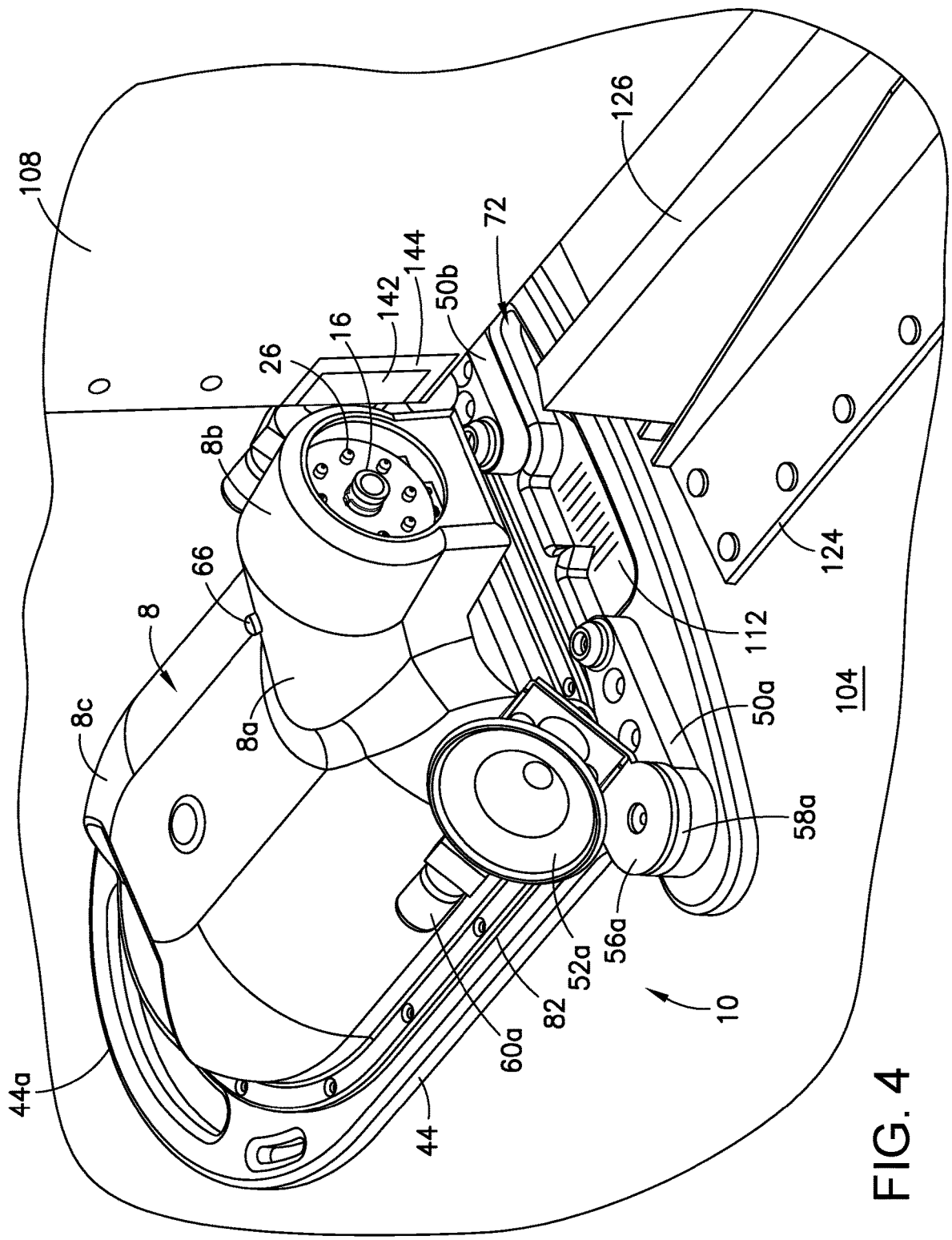
FIG. 4 is a diagram representing an isometric view of a prototype of a tracking device in accordance with one embodiment.

FIG. 4 presents an isometric view of a prototype of a tracking device 10 in accordance with one embodiment. The tracking device 10 comprises a base plate 44 and a housing 8 which is attached to the base plate 44 by means of a multiplicity of fasteners (not shown). The base plate 44 may be made of DuPont™ Delrin® acetal resin, which is lightweight and can be machined to tight tolerances. The housing 8 comprises a head 8b, a body 8c and a neck 8a that connects the head 8b to the body 8c. The housing 8 may be made of laser-sintered nylon, which is durable and can be manufactured to form a part having large overhang areas, i.e., the neck 8a which leads to the camera lens opening. Another suitable material for housing 8 would be blow-formed polypropylene. As seen in FIG. 4, an LED bubble 66 (for indicating that the tracking device is in an active state) is mounted to the neck 8a of housing 8. A gasket 82, which may be made of adhesive butyl rubber, may be placed between housing 8 and base plate 44 to seal the housing 8 from water. Besides butyl rubber, any number of self-adhesive rubber seals may be used. However, the material should be approved by the factory for contact with the aircraft skin, in case the rain washes residues off of the seal and they end up on the paint. For example, silicone or PTFE-based rubbers should not be used. Various electrical and electro-mechanical components of tracking device 10 are disposed inside housing 8, which protects those components from weather and impacts.

As seen in FIG. 4, the base plate 44 has a handle 44a and an opening 72. The tracking device 10 is placed on the rear fuselage portion 104 in a position that overlies and is fixed relative to the aforementioned alignment indexing plate 112, which is visible through the opening 72. As will be explained later with reference to FIG. 9A, the tracking device 10 further comprises a pair of locating mechanisms which sit on the respective indexing plate fasteners 114 and 116 seen in FIG. 2. When the tracking device 10 is properly seated on indexing plate fasteners 114 and 116, the maintenance technician knows the precise location of the tracking device 10 relative to the aircraft. More specifically, the precise location (i.e., position and orientation) of the tracking device 10 relative to the axis of rotation of the rudder 108 and relative to the centerline of the rudder 108 when it is in its neutral position (i.e., when the rudder centerline overlaps the baseline BL 0.00 seen in FIG. 3) are known.

The tracking device 10 further comprises an infrared camera 16 having a field of view that encompasses a portion of the end face (i.e., trailing edge 128) of the rudder 108 when tracking device 10 and rudder 108 are in the respective locations seen in FIG. 4, i.e., when the aforementioned locating mechanisms are seated on the indexing plates which attach the alignment index plate 112 to the fuselage and when the rudder 108 is in its neutral position. The infrared camera 16 is preferably of a type that detects infrared light while blocking out most visible light and that incorporates firmware and circuitry which identifies and locates pre-defined targets.

Still referring the FIG. 4, the tracking device 10 further comprises an array of infrared light-emitting diodes (LEDs) 26 which are activatable to project infrared light that illuminates at least a portion of the end face (i.e., see trailing edge 128 in FIG. 2) of the rudder 108. An optical target comprising a strip of reflective material (see, e.g., reflective tape 142 in FIG. 2) may be temporarily attached to the end face of trailing edge 128 of rudder 108. Preferably, the LEDs 26 are circumferentially distributed around the lens of camera 16 at equiangular intervals along one or more circles so that the LEDs 26 shine infrared light onto the optical target in a uniform pattern. Some of that infrared light will be reflected back toward the lens of infrared camera 16 by the reflective material of the optical target. (An optical target in accordance with one embodiment will be described later in detail with reference to FIGS. 13A and 13B.) Although FIG. 4 depicts eight LEDs 26, the number of LEDs may differ from eight. For example, the array may include thirty-two or forty-eight LEDs 26. In accordance with one implementation, the LEDs 26 are mounted to an LED array board having pulse-width modulation circuitry printed thereon, which LED array board is housed in the head 8a of housing 8.

In accordance with one implementation, the infrared camera 16 is a Pixy CMUcam5 infrared camera comprising an Omnivision OV9715 image sensor and an NXP LPC 4330 processor which is configured to identify and locate a predefined reflective target having a rectangular reflective area with a centerline that is collinear with the centerline of the end face of trailing edge 128 of rudder 108 being imaged. More specifically, the camera processor is configured to detect first and second edges of the returned portion of the projected infrared light from the reflective material. The tracking device 10 further comprises a microcontroller (not shown in FIG. 4, but see microcontroller 14 in FIG. 16) that is configured to calculate first and second positions of the first and second edges respectively of the returned portion of the projected infrared light from the reflective material relative to a frame of reference of the optical indication system, calculate a midway position between the first and second positions, and then control a display screen (see, e.g., display screen 28 in FIG. 5) to display symbology indicating the midway position of the rudder 108 relative to the frame of reference of the optical indication system. In the configuration depicted in FIGS. 4-7, the tracking device 10 is seated on but not secured to the rear fuselage portion 104. Since only one of the two mechanisms for securing the tracking device 10 to the rear fuselage portion 104 is visible in FIG. 4 while both are visible in FIG. 5, those mechanisms will now be described in detail with reference to FIG. 5, which presents another isometric view of the tracking device 10 in which display screen 28 is visible.

Figure 5:
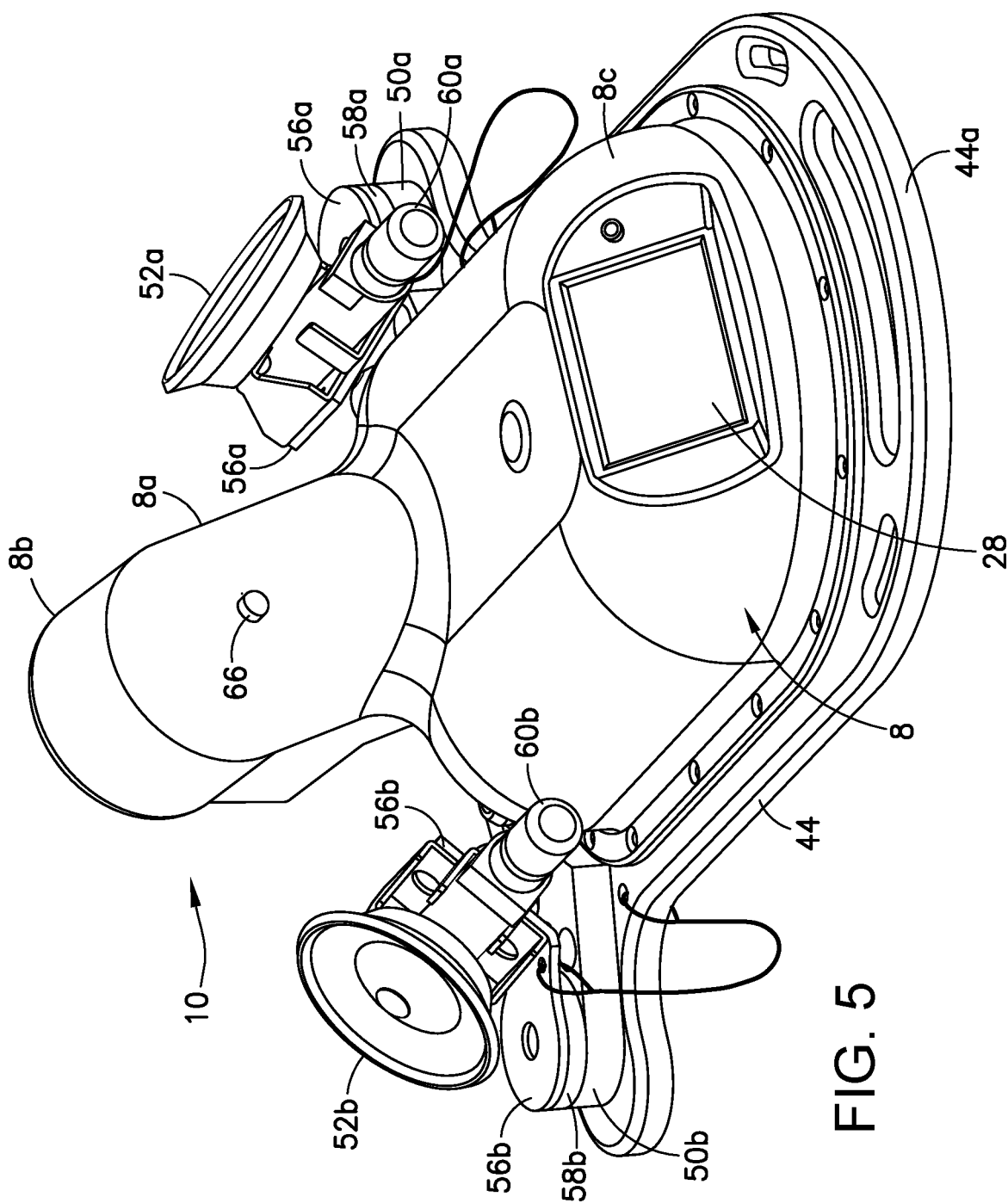
FIG. 5 is a diagram representing another isometric view of the tracking device depicted in FIG. 4.

Referring to FIG. 5, the tracking device 10 comprises a pair of plunger bosses 50a and 50b, which are attached to the base plate 44. The plunger bosses 50a and 50b may be made of a 3-D printed thermoplastic polymer such as acrylonitrile butadiene styrene (ABS), milled aluminum or any other suitable material. A pair of permanent magnets 58a and 58b are respectively attached to plunger bosses 50a and 50b by means of socket head cap screws which come from underneath. (Each magnet has a threaded hole in the bottom which does not protrude all the way through to the top.) In one implementation, rubber-encased neodymium magnets were used.

As will be explained in more detail later with reference to FIG. 9A, the plunger bosses 50a and 50b also hold and constrain respective indexing plunger cups 54a and 54b (see FIG. 7), which receive the respective heads of indexing plate fasteners 114 and 116 (see FIG. 2), and also house respective plunger springs (see, e.g., plunger spring 76 in FIG. 9A), which urge the indexing plunger cups 54a and 54b toward the heads of indexing plate fasteners 114 and 116.

The tracking device 10 further comprises a pair of suction cups 52a and 52b which are mounted to respective suction cup mounting plates 56a and 56b. The suction cups 52a and 52b are of the hand-operated vacuum type. The suction cups 52a and 52b, which are attached to the suction cup mounting plates 56a and 56b (e.g., made of steel or other ferromagnetic material), can be removably coupled to the tracking device 10 by magnetically coupling the suction cup mounting plates 56a and 56b to magnets 58a and 58b respectively. The magnets 58a and 58b enable quick stowage of suction cups 52a and 52b. A pair of ball knobs 70a and 70b (see FIG. 7) made, e.g., of phenol formaldehyde resin, screw to respective studs on the suction cup mounting plates 56a and 56b to provide something for the user to grab hold of. Each ball knob snugs against the angled portion of the respective suction cup mounting plates to hold it in place. The magnets 58a and 58b and suction cup mounting plates 56a and 56b are designed to produce a magnetic force small enough to allow the maintenance technician to readily uncouple the suction cups 52a and 52b from the magnets 58a and 58b by manipulation of handles 60a and 60b respectively attached to the suction cups 52a and 52b.

Figure 7:
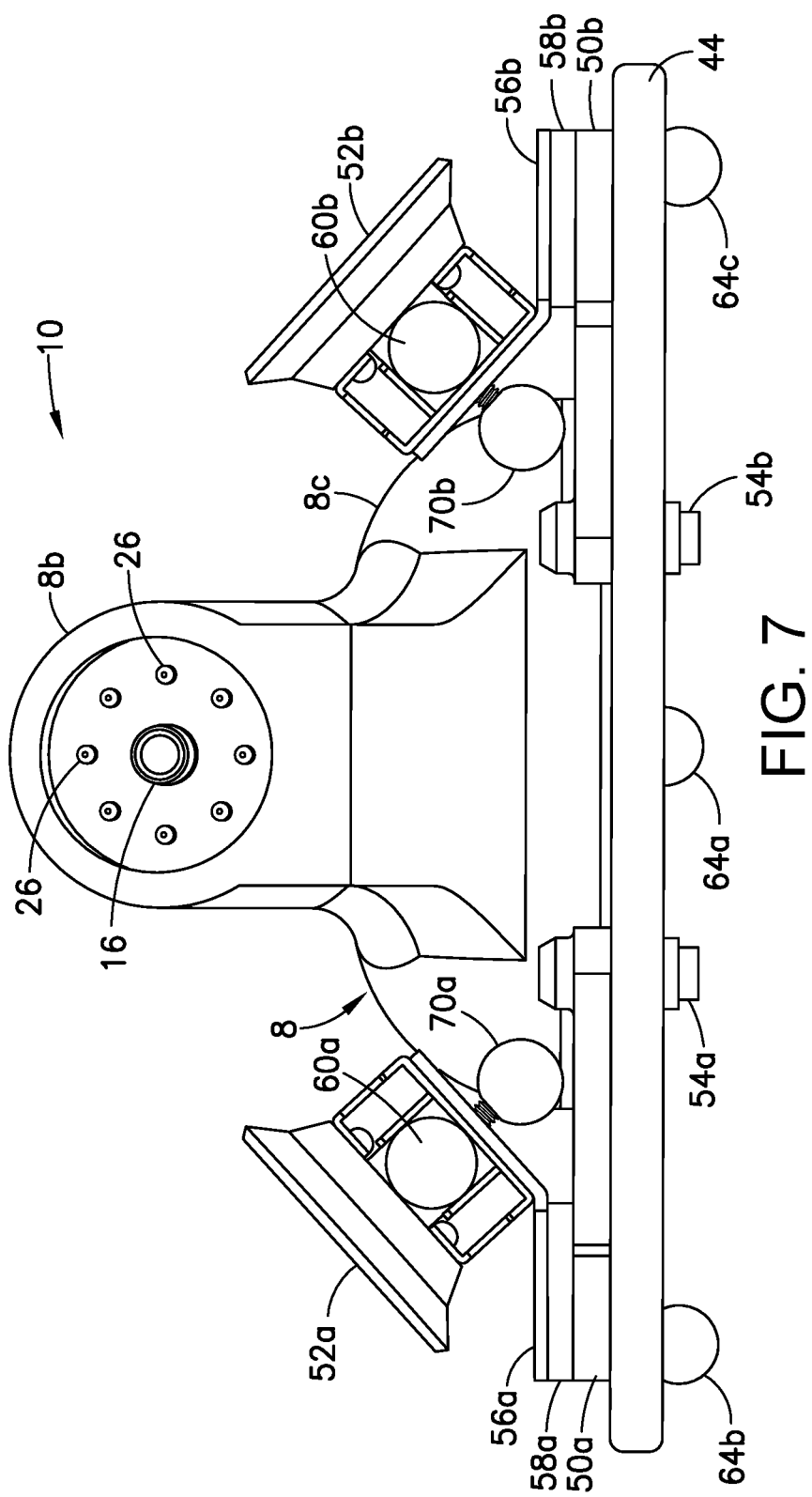
FIG. 7 is a diagram representing an end view of the tracking device depicted in FIG. 4.
Figure 15A:
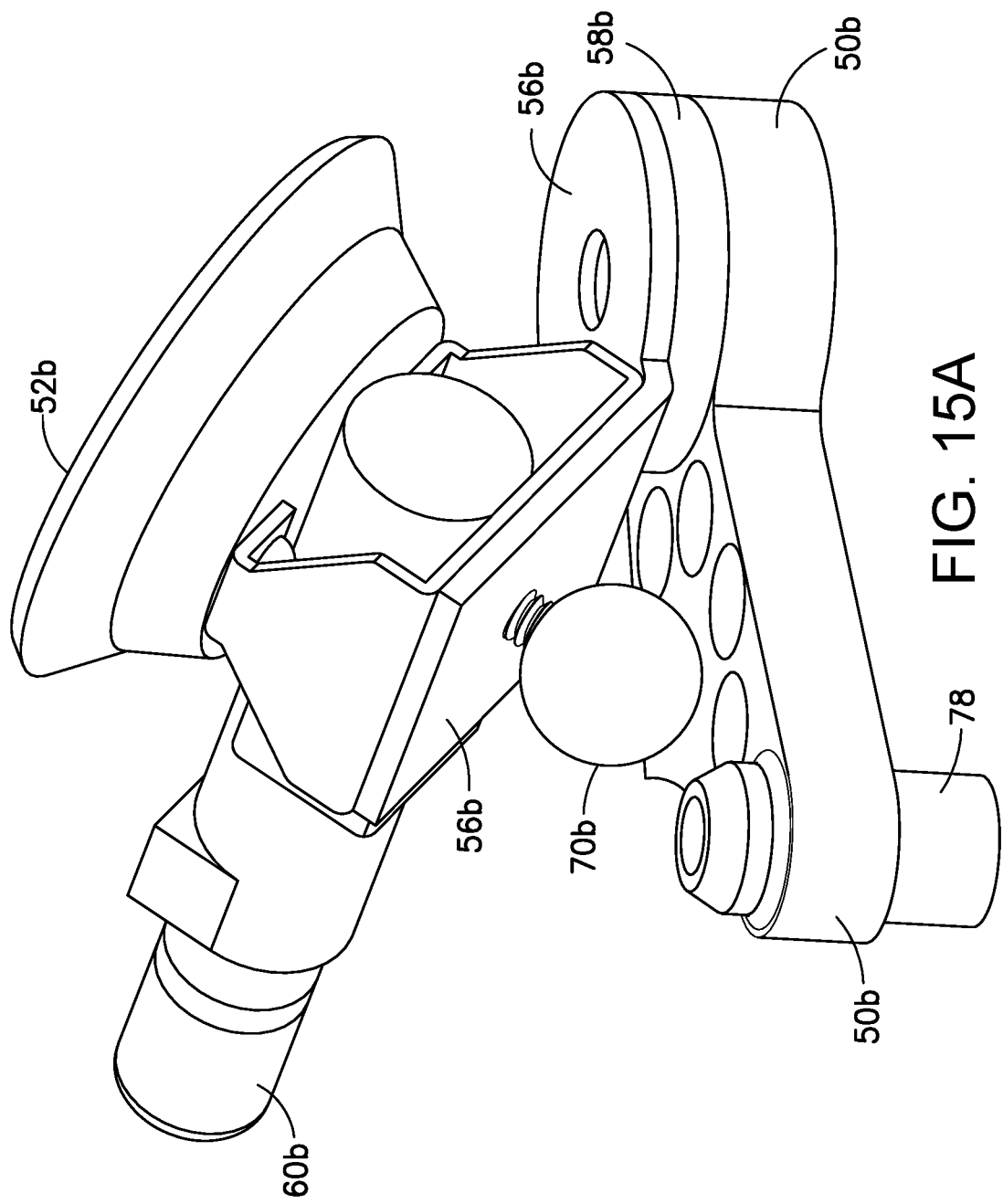
FIGS. 15A and 15B are diagrams representing respective isometric views of a portion of a tool platform in accordance with one embodiment, which tool platform can be employed in the tracking device depicted in FIGS. 4-7.
Figure 15B:
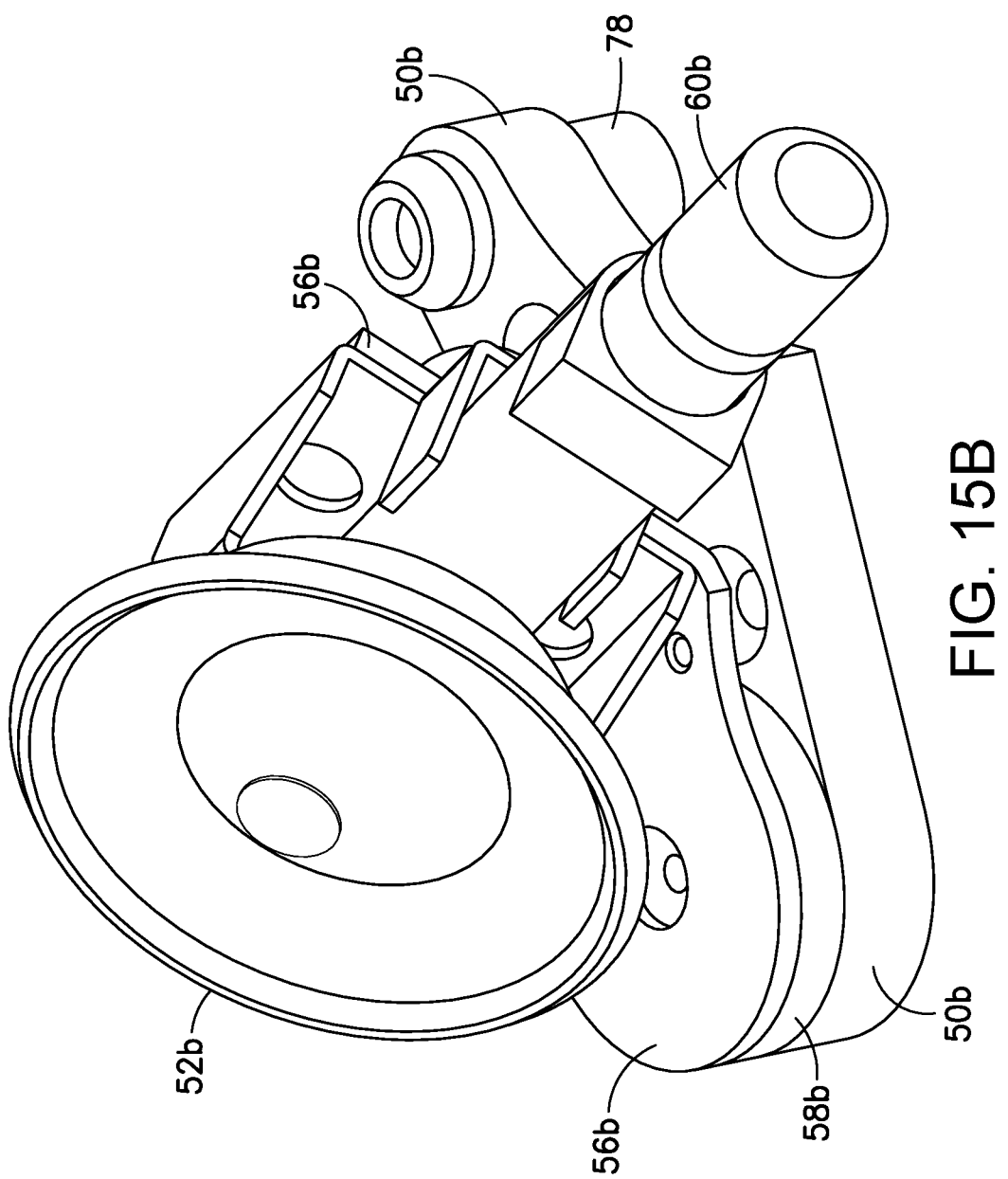

FIGS. 15A and 15B are diagrams representing respective isometric views, on an enlarged scale, of one of the mechanisms for securing the tracking device 10 to the surface of the rear fuselage portion 104 depicted in FIGS. 5 and 7. More specifically, FIGS. 15A and 15B show plunger boss 50b, which holds magnet 58b, and suction cup 52b, which is mounted to suction cup mounting plate 56b. The suction cup mounting plate 56b comprises a horizontal portion that is magnetically coupled to magnet 58b and an angled portion to which ball knob 70b is attached. The maintenance technician is able to manually uncouple the suction cup 52b from the magnet 58b by manipulation of handle 60b, one end of which is attached to the subassembly comprising suction cup 52b and suction cup mounting plate 56b.

Referring again to FIG. 5, the suction cup mounting plates 56a and 56b are respectively tethered to the base plate 44 by respective cables 62a and 62b (e.g., short lanyard cables clad in Nomex sleeving to protect the surface of the fuselage and improve manageability). The ends of cable 62a are respectively looped through holes in the base plate 44 and the suction cup mounting plate 56a, while the ends of cable 62b are respectively looped through holes in the base plate 44 and the suction cup mounting plate 56b. Once the suction cups 52a and 52b have been separated from the magnets 58a and 58b by the user, the user can then attach the suction cups 52a and 52b to the aircraft skin anywhere so long as the cables 62a and 62b are slack. Thus the magnets 58a and 58b are a way to stow the suction cups 52a and 52b on the tool when not in use. The user pulls the suction cups 52a and 52b off of the magnet bases and then puts them to use by attaching them to the aircraft skin. Cables 62a and 62b should be slack when doing this, so as to avoid pulling the tool off location. This design also reduces the risk of the suction cups 52a and 52b constraining the position of the tool, which is solely the job of the indexing plunger cups 54a and 54b (see FIG. 7). The suction cups 52a and 52b provide a level of safety in case the tracking device is somehow knocked off of the fastener heads. They hold with a specified force and add a margin of safety with regard to the risk of the tool falling off of the aircraft.

Figure 6:
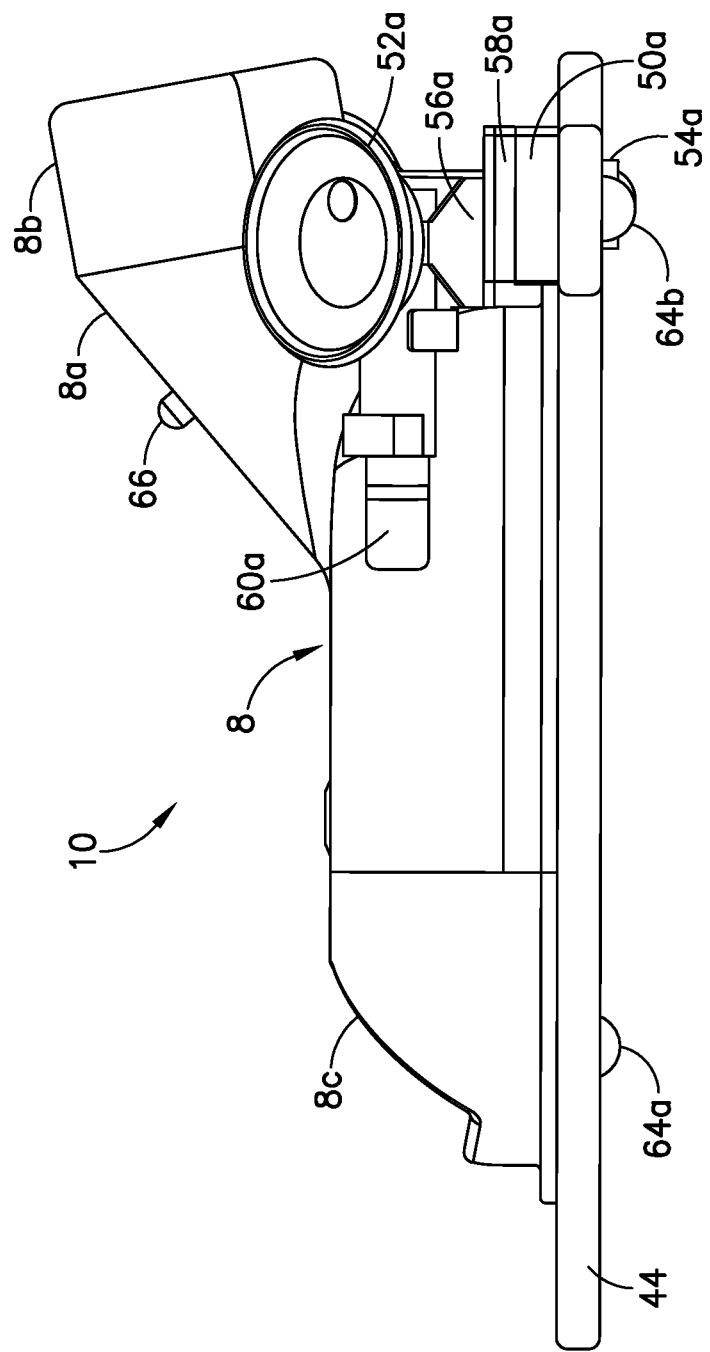
FIG. 6 is a diagram representing a side view of the tracking device depicted in FIG. 4.

FIGS. 6 and 7 show side and end views respectively of the tracking device depicted in FIGS. 4 and 5. Three balls 64a-64c (made, e.g., of DuPont™ Delrin® acetal resin) are situated in respective recesses 68a-68c formed in the base plate 44 (see FIG. 9) and project downward beyond the plane of the lower surface of base plate 44. When the tracking device 10 is located as shown in FIG. 4, balls 64a-64c contact the surface of the rear fuselage portion 104, so that the base plate 44 does not. The balls 64a-64c interface with aircraft skin to steady the tracking device 10 while protecting the skin's painted surface.

Underneath the base plate 44 are two spring-loaded aluminum indexing plunger cups 54 and 54b that interface with the heads of the indexing plate fasteners 114 and 116. Portions of indexing plunger cups 54a and 54b are visible in FIG. 7. These indexing plunger cups, which cup the exteriors of the heads of the indexing plate fasteners 114 and 116, may be of the type shown in cross section in FIG. 9A (see indexing plunger cup 54 in FIG. 9A). When indexing plunger cups 54a and 54b respectively engage the heads of the indexing plate fasteners 114 and 116, the camera 16 is thereby aligned with the center of the aircraft to a certain degree of precision and repeatability.

Figure 8:
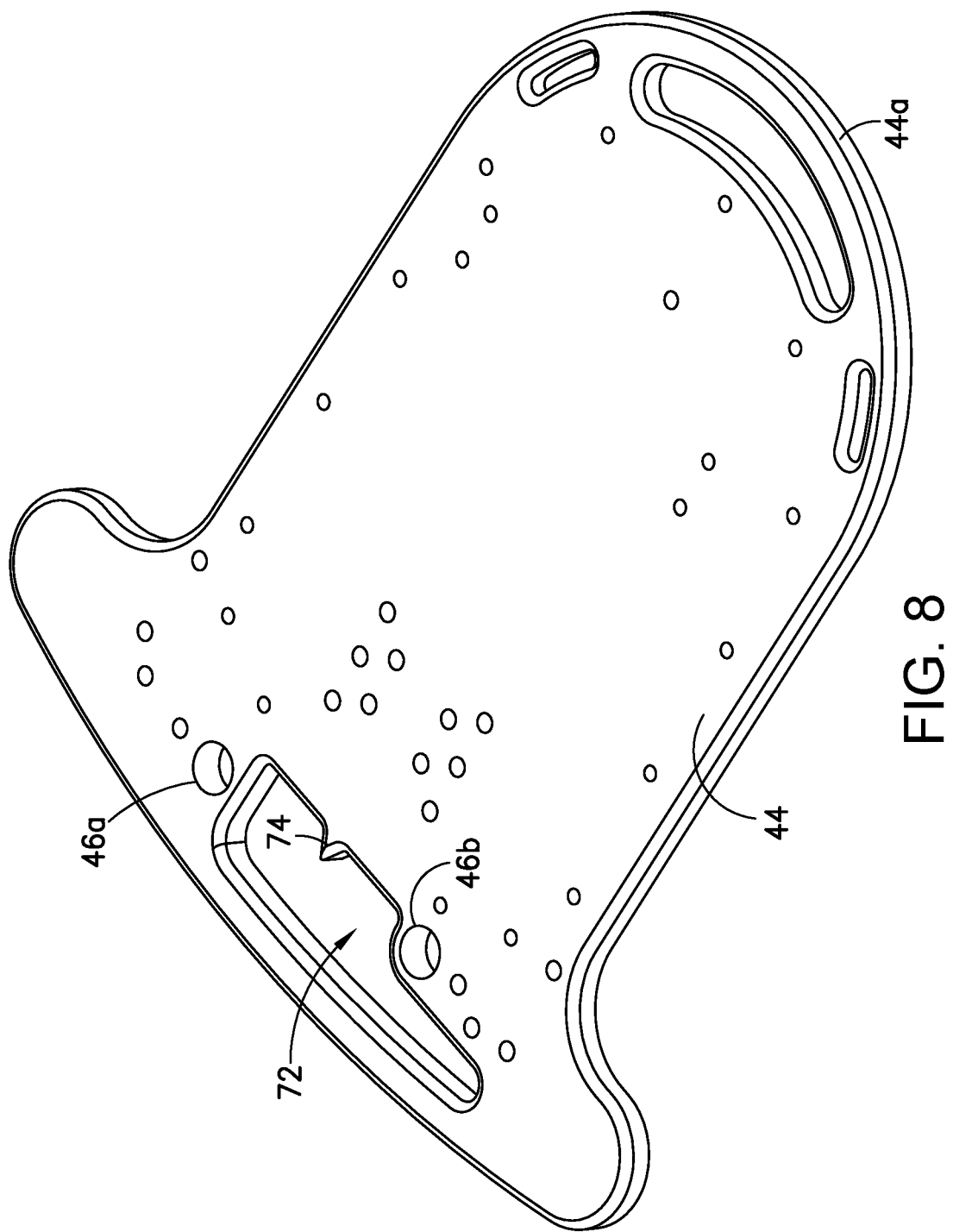
FIG. 8 is a diagram representing an isometric view of a base plate of the tracking device depicted in FIG. 4.

FIG. 8 presents an isometric view of the top surface of the base plate 44 of the tracking device 10. As seen in FIG. 8, the base plate 44 has an opening 72 with an alignment point 74. When the tracking device 10 is placed on the rear fuselage portion 104 in the position shown in FIG. 4, the opening 72 overlies the alignment indexing plate 112 and serves as a viewing window that provides visual feedback to the maintenance technician regarding the current position of indexing plunger cups 54a and 54b (which are respectively slidably seated in openings 46a and 46b in base plate 44) relative to the indexing plate fasteners 114 and 116 during attempts to align the former with the latter. When the tracking device 10 properly positioned, the alignment point 74 will align with the aircraft butt line marking 120 of the alignment indexing plate 112.

Figure 9:
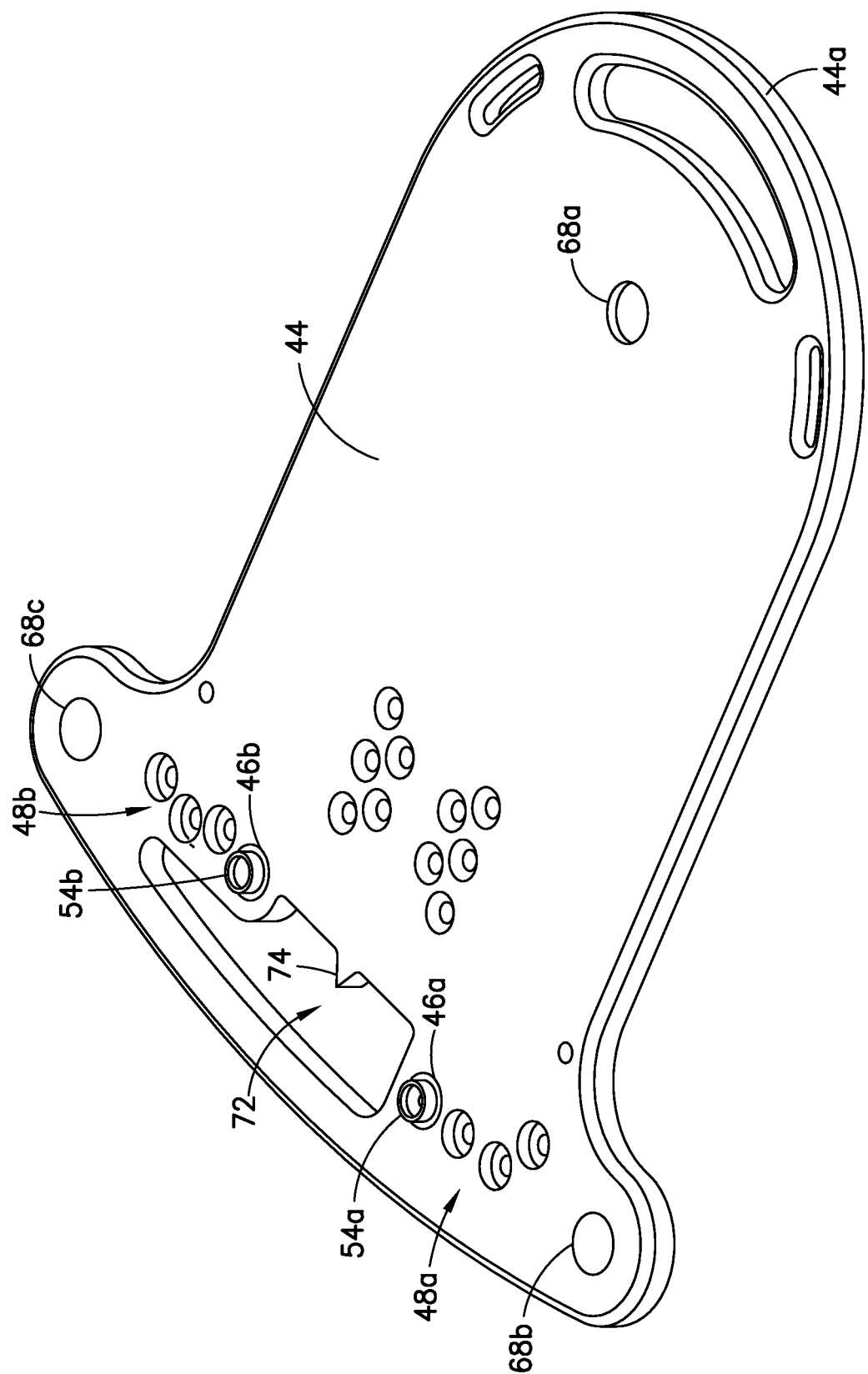
FIG. 9 is a diagram representing another isometric view of the base plate depicted in FIG. 8.

FIG. 9 presents an isometric view of the bottom surface of the base plate 44 of the tracking device 10 when indexing plunger cups 54a and 54b are respectively slidably seated in openings 46a and 46b. In addition, the base plate 44 has a first set 48a of openings designed to receive respective fasteners for attaching the plunger boss 50a (not shown in FIG. 9) to the base plate 44 and a second set 48b of openings designed to receive respective fasteners for attaching the plunger boss 50b (not shown in FIG. 9) to the base plate 44. As previously mentioned, the bottom the base plate 44 also has three recesses 68a-68c for receiving balls 64a-64c.

Figure 9A:
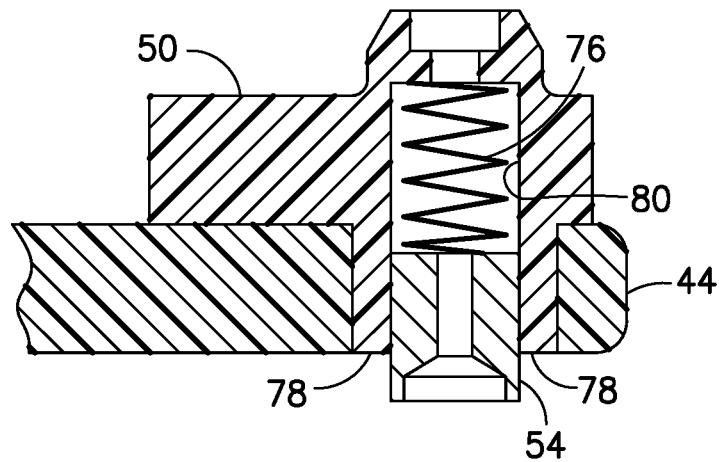
FIG. 9A represents a magnified sectional view of a plunger boss attached to a portion of the base plate depicted in FIGS. 8 and 9 in accordance with the tracking device depicted in FIG. 4.

FIG. 9A represents a magnified sectional view of a plunger boss 50 supported on a portion of the base plate 44 depicted in FIGS. 8 and 9. A bushing portion 78 of plunger boss 50 is seated in a circular cylindrical opening formed in the base (see, e.g., openings 46a and 46b in FIG. 8). An indexing plunger cup 54 is seated inside a circular cylindrical bore 80 formed in plunger boss 50. The bore 80 constrains vertical movement of the indexing plunger cup 54, while allowing it to slide along the bore axis. A plunger spring 76 installed between indexing plunger cup 54 and the closed end of bore 80 urges the indexing plunger cup 54 downward so that the end of indexing plunger cup 54 projects beyond the plane of the bottom surface of base plate 44. The indexing plunger cup 54 has a cavity designed to fit around the head of an indexing plate fastener. The tracking device 10 has a known fixed position in the frame of reference of the aircraft when the pair of indexing plunger cups 54a and 54b (see FIG. 7) are properly seated on the respective heads of indexing plate fasteners 114 and 116 (see FIG. 2).

As seen in FIG. 5, the tracking device 10 further comprises a display screen 28 which is installed in an opening formed in the body 8c of the housing 8. The display screen 28 is controlled by an onboard computing system inside housing 8 of the tracking device 10. That computing system is configured to perform the following operations: (1) processing image data captured by the camera 16 to determine a current position of the rudder 108 relative to its neutral position; and controlling the display screen 28 to display symbology indicating the current position of the rudder 108 relative to its neutral position. In accordance with one implementation, the display screen 28 may be a TFT Touch Shield, which is commercially available from Seeedstudio, Shenzhen, China, which device incorporates an ILI9341 LCD driver integrated circuit, which is commercially available from Ili Technology Corp., Zhubei City, Taiwan. The TFT Touch Shield is a four-wire resistive touch screen that may be used as both a display device and an input device. In the configuration proposed herein, the display screen 28 displays measurements and allows for touch control of the tracking device 10. The display screen 28 also includes a non-transitory tangible computer-readable storage medium (such as a non-volatile memory card) for storing image files for the measurement screen and the splash screens that show up in the program.

The computing system onboard the tracking device 10 processes the image data by detecting first and second edges of the optical target on the end face of the control surface (e.g., the trailing edge 128 of the rudder 108), and calculating first and second positions of the first and second edges respectively, the current position of the centerline being midway between the first and second positions.

Figure 10:
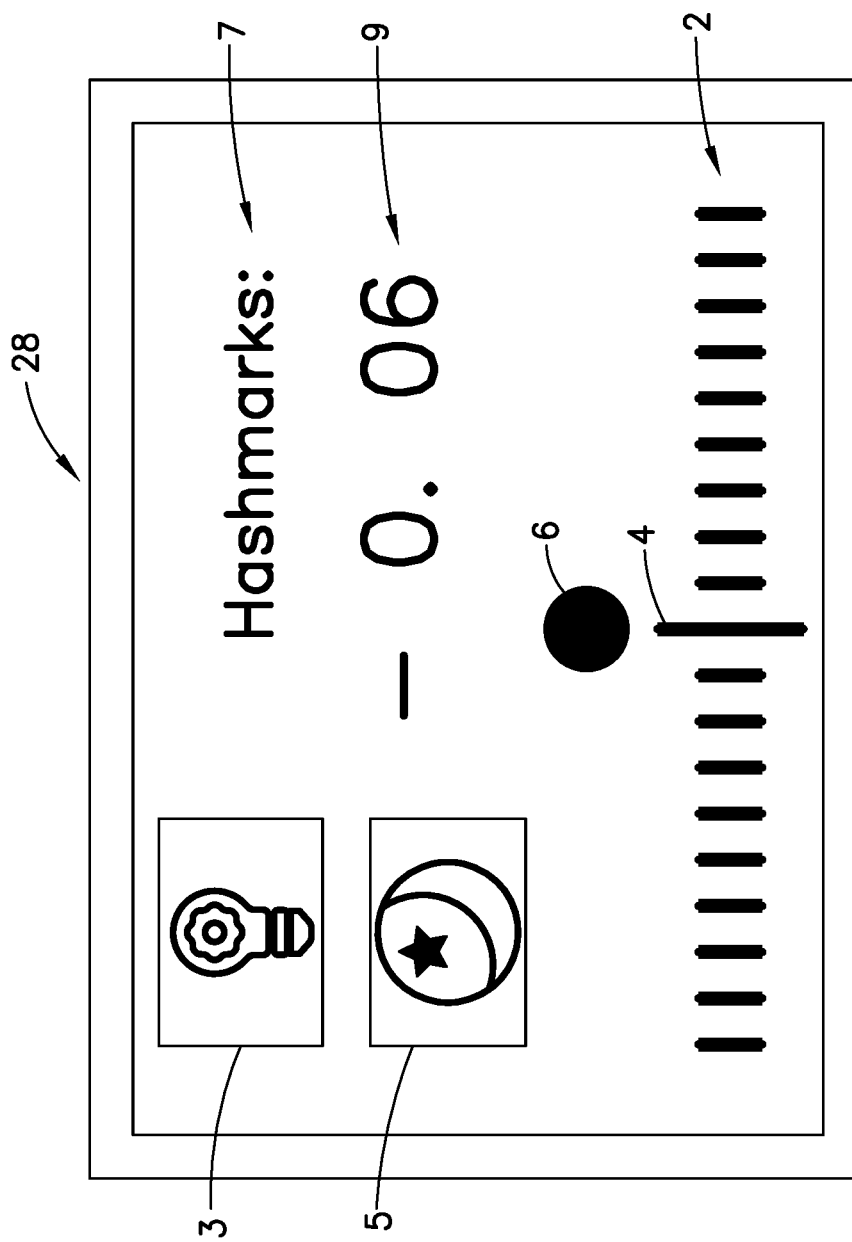
FIG. 10 is a diagram showing a screenshot being presented on the display screen seen in FIG. 5 during tracking of rudder position during a rudder rigging operation.

FIG. 10 is a diagram showing a screenshot being presented on the display screen 28 during tracking of rudder position. Symbology is displayed representing the measurement results relative to a simulated alignment indexing plate 2. In accordance with one embodiment, the displayed symbology comprises a graphical representation 4 of an aircraft butt line marking (e.g., a hashmark) corresponding to a baseline position of a centerline of the target on the end face when the rudder is in its neutral position and a movable indicator 6 separated from the graphical representation 4 of the aircraft butt line marking by a distance proportional to the distance separating the current position of the centerline from its baseline position. The symbology further comprises a plurality of alphanumeric characters representing an offset of the current position of a centerline of the end face of the control surface relative to a baseline position of the centerline corresponding to the neutral position of the rudder. The plurality of alphanumeric characters include alphabetic characters in a display field 7 and numeric characters in a display field 9. The alphabetic characters in display field 7 indicate the type of dimensional units (e.g., hashmarks or inches) and the numeric characters in display field 9 represent the number of those dimensional units. As the rudder 108 is deflected during a measurement session, the movable indicator 6 will move left or right relative to the simulated alignment indexing plate 2 and the numeric characters will change to reflect the changing magnitude of the deviation from the baseline position.

The user interface seen in the screen shot shown in FIG. 10 further includes activatable virtual buttons, namely, an adaptive optics icon 3 which the operator can touch to cause the display of a window that enables the operator to trigger an adaptive optics function and a sleep mode icon 5 which the operator can touch to cause the main unit to enter a sleep mode.

Figure 11:
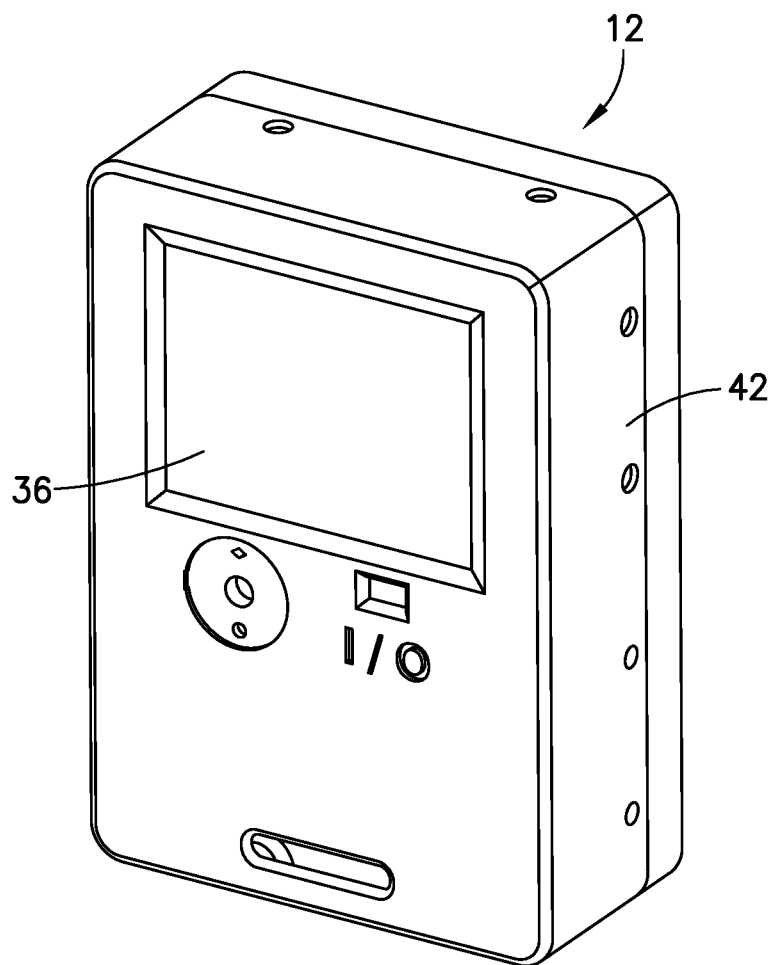
FIG. 11 is a diagram representing an isometric view of a handheld unit that can be used in conjunction with the tracking device depicted in FIG. 4.

In accordance with a preferred embodiment, the remote optical control surface indication system further comprises a handheld unit in the form of a wireless digital readout for remote access to the same measurement results represented in FIG. 10. FIG. 11 presents an isometric view of a handheld unit 12 that can be used in conjunction with the tracking device 10 depicted in FIG. 5. The handheld unit 12 comprises a housing 42 and a display screen 36, which may be the same type of resistive touch screen as display screen 28 of the tracking device 10. Thus the display screen 36 may be used as both a display device and an input device. In the configuration proposed herein, the display screen 36 displays measurement results received from the tracking device 10 and allows for touch control of the tracking device 10. The display screen 36 also includes a non-transitory tangible computer-readable storage medium.

The handheld unit 12 further comprises a computing system (inside housing 42 and not visible in FIG. 11) which is configured so that the display screen 36 displays symbology indicating the current position of the control surface relative to its neutral position based on information received from the tracking device 10, as shown in FIG. 10. The measurement screens of the two display screens 28 and 36 are meant to mirror each other while the handheld unit 12 is receiving measurement results from the tracking device 10.

In addition to display of the measurement screen, the handheld unit 12 has the capability to control the main unit. The handheld unit 12 can switch the main unit into and from sleep mode. The handheld unit 12 can also trigger an adaptive optics routine on the main unit, which automatically adjusts the camera brightness for optimal target resolution. The adaptive optics routine will be described in detail below with reference to FIG. 16.

Figure 12:
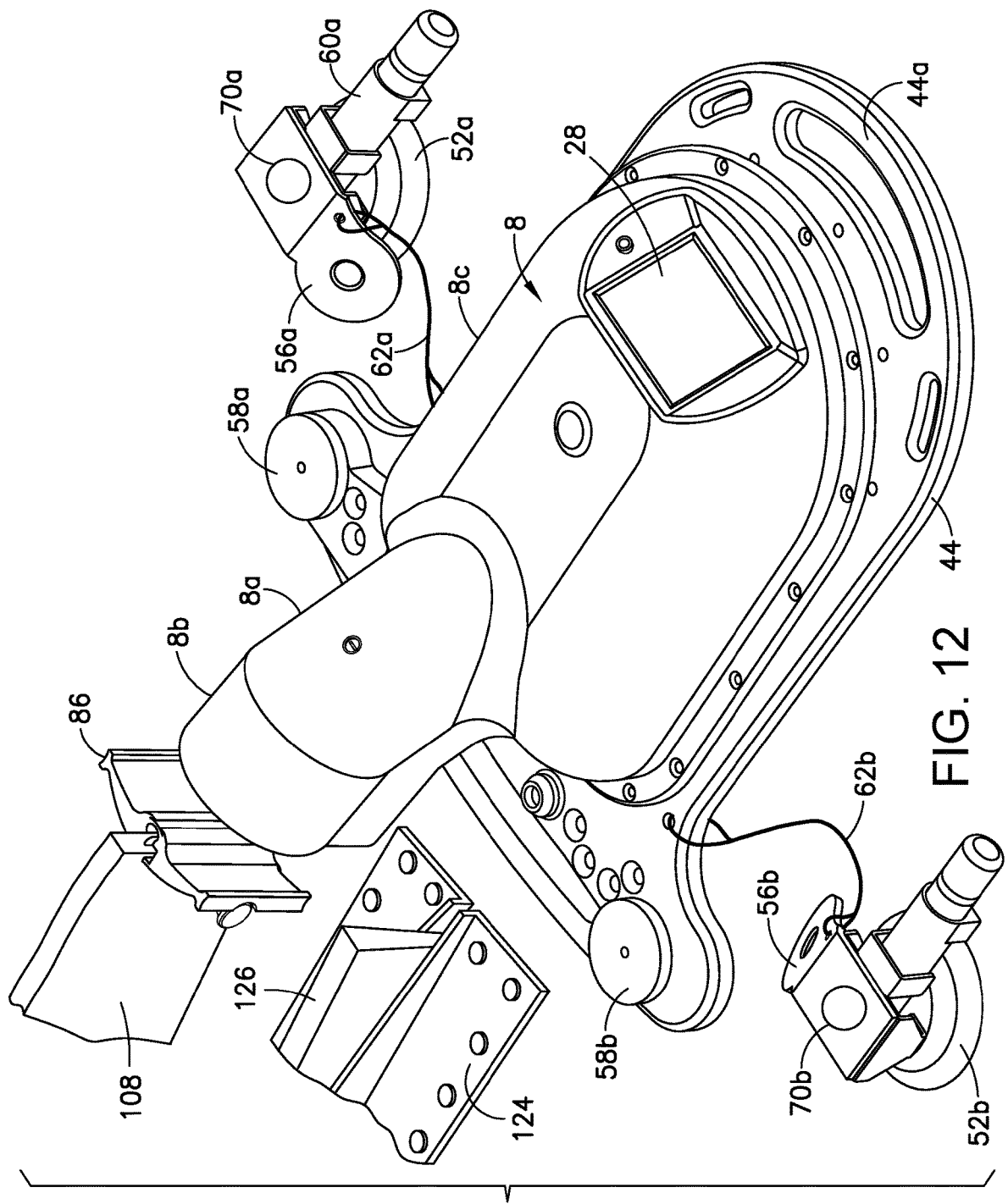
FIG. 12 is a diagram representing an isometric view of an optical indication system that uses an optical target in accordance with an alternative embodiment.

In accordance with one embodiment, the optical target viewed by the tracking device is in the form of a reflective tape 142 (shown in FIG. 2) adhered to the trailing edge 128 of the rudder 108, which reflective tape 142 reflects infrared light transmitted by the LEDs 26 back toward the lens of camera 16 (see FIG. 7). In accordance with another embodiment depicted in FIG. 12, an optical target 86 is attached to the trailing edge of rudder 108, which optical target comprising a reflector and a pair of wings made of opaque material disposed on opposite sides of the reflector as described in detail below.

FIGS. 13A and 13B are diagrams representing different isometric views of an attachable optical target 86 in accordance with one embodiment. The main body of the optical target 86 may be made of a stereolithographic resin material. The optical target 86 comprises a pair of wings 96a and 96b disposed on opposite sides of a main slot 88. The wings 96a and 96b of optical target 86 shade interference light. A rectangular slot 89 is inset within the side wall of the main slot 88. A clamp arm (not shown in FIGS. 13A and 13B), in the form of a strip of semi-hard urethane rubber, sits inside the rectangular slot 89. That clamp arm is pushed by the nose 90 of a retractable spring plunger 92 (see FIG. 13B) to clamp onto the trailing edge 128 of the rudder 108. The spring plunger 92 may be made of steel. In accordance with an alternative embodiment, a swivel-pad thumb screw can be substituted for the retractable spring plunger 92.

As seen in FIG. 13A, a strip of infrared reflective diffusive tape 94 (capable of reflecting infrared light) is adhered to a central portion of the front face of the optical target 86. The strip of infrared reflective diffusive tape 94 is also highly scattering to prevent glare and smoothen the appearance of the target edges. The optical target 86 provides a reflective target for the infrared camera 16, negating the need to apply reflective tape directly on the trailing edge 128 of rudder 108.

Thus the infrared camera 16 sees either a portion of the rudder 108 with reflective tape (such as reflective tape 142 seen in FIG. 2) attached or a portion of the attachable target with reflective tape embedded (such as the strip of infrared reflective diffusive tape 94 seen in FIG. 13A). The system is programmed to accept either one without discernment. The software is configured to assume that the target it sees is within the correct range of width, and that it has at least a certain two-dimensional area. In this manner, the system can tell when it is detecting glare or blobs of interference light, thereby avoiding the vast majority of situations in which an erroneous measurement could be passed due to happenstance lighting conditions.

Before the tracking device 10 is ready for use in a rigging operation, the measuring system should be calibrated. FIGS. 14A and 14B present different isometric views of a calibration jig 130 that can be used to calibrate the tracking device 10. The calibration jig 130 comprises a base plate 132 and a tower 134 which stands on the base plate 132. The tower 134 narrows to form a vertical post 136 that is precisely located on center.

During set-up, the calibration jig 130 is placed in front of the tracking device with the vertical post 136 facing the camera. The base plate 132 of the calibration jig 130 sits on a flat surface, and the user sets the tracking device 10 onto the calibration jig 130 so that the indexing plunger cups 54a and 54b of the former settle into a pair of holes 140a and 140b on base plate 132 of the latter. The vertical post 136 is covered with the same reflective tape (not shown in FIG. 14B) as the optical target. The vertical post 136 is disposed in front of the camera, and the camera recognizes the post as a target. With the unit on, the user presses a button on the screen to zero the device. The calibration software asks for a confirmation button press, and when given, stores the left-right position of the target (i.e., the baseline zero value) in EEPROM memory on a main microcontroller board (not shown). The software then regards that position as zero.

Figure 16:
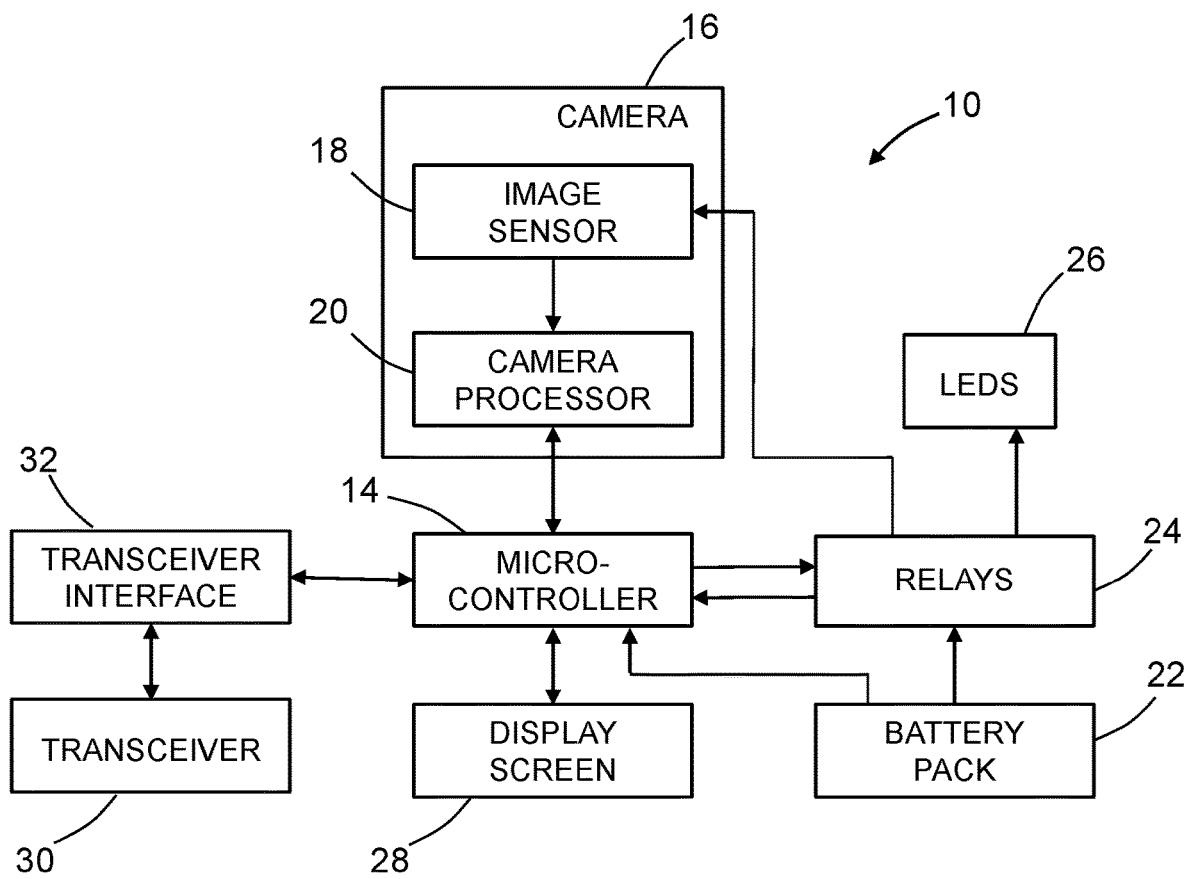
FIG. 16 is a block diagram identifying components of a tracking device in accordance with one embodiment.

In accordance with a further advantageous feature, the zeroing function can only be accessed by the user if the unit detects that it is physically sitting on the zeroing jig assembly. This can be accomplished by embedding a Hall-effect sensor into the base plate of the main unit, and embedding a small rare-earth magnet into the base plate of the zeroing jig. By this method, the user cannot accidentally zero the unit on any target that is not aligned with what is supposed to be aircraft center. FIG. 16 is a block diagram identifying components of a tracking device 10 in accordance with one embodiment. As previously mentioned, the camera 16 comprises an image sensor 18 and a camera processor 20. The camera processor 20 communicates directly with a microcontroller 14 on a main microcontroller board (not shown) that is disposed inside the housing 8 (see FIG. 4) of the tracking device 10. The microcontroller 14 also controls the display screen 28. The microcontroller 14 handles all analog and digital inputs and outputs, runs the tracking device programming, and stores the zero position to EEPROM memory. In one implementation, the main microcontroller board is an Arduino Mega 2560 microcontroller board, which has 54 digital input/output pins (of which 15 can be used as PWM outputs to the LEDs 26), 16 analog inputs, four UARTs (hardware serial ports) (one of which is used to connect the camera board to the main microcontroller board), a 16-MHz crystal oscillator, a USB connection, and a power jack. The microcontroller 14 controls the on/off of the LEDs 26, but it does so via a relay board module. The relay board module holds two electromechanical relays 24: one for the LEDs 26 (12 V switched) and one for the camera 16 (5 V switched). The LED driver circuitry is integrated with the LED array board, and comes already built as part of that board. All that is required to drive the LEDs 26 is to apply a voltage of 12 V.

The microcontroller 14 also communicates with a transceiver 30 via a transceiver interface board 32. The transceiver 30 may be a 2.4-GHz radio transceiver module capable of wirelessly relaying measurements and commands between the tracking device 10 and the handheld unit 12. In one implementation, the transceiver 30 is an Xbee Pro S1 802.15.4 module, while the transceiver interface board 32 is a Seeedstudio Xbee shield with a serial peripheral interface (SPI) pass-through suitable for routing signals between Xbee radios and Arduino microcontroller boards. (A "shield" is any board that is made to fit the layout and plug right into an Arduino microcontroller board.) The Xbee Pro S1 802.15.4 module is mounted on the Seeedstudio Xbee shield. The latter provides power to the former, contains circuitry for logic input/output, and allows the user to select serial pins with jumpers. The Xbee shield has its own processor built in. The Xbee is pre-programmed prior to installation and then sends and receives data to and from the Arduino microcontroller board. Once the Xbee is programmed and installed, it operates autonomously.

A battery pack 22 supplies constant 12-V power to the relay board for the LED array 26, and also supplies switched 5.5-V power to the microcontroller 14 and the relay board for the camera 16. The microcontroller 14 then in turn supplies appropriate voltages to the display screen 28, the transceiver interface 32, and the RGB indicator LED (housed in LED bubble 66 seen in FIG. 4). The RGB indicator LED is mounted on the neck 8*a* of the housing 8 and there is another one on the front panel of the handheld unit 12 (see FIG. 11). They serve to indicate when the devices are turned on, when a valid target has been detected, and when an error state is indicated.

In accordance with one embodiment, the camera processor 20 is programmed to adjust the camera's brightness in order to optimally resolve the target while ignoring background infrared light and glare. One may not be able to choose a single brightness setting to work in all possible lighting conditions. Light from the sun, an open hangar door, or High Intensity Discharge (HID) lighting can complicate target detection and accuracy. For some camera hardware designed strictly for machine vision applications, there is currently no practical way to see a live camera feed while running the program. Therefore, the camera processor 20 may execute an adaptive optics subroutine (i.e., software) that judges which brightness is best.

The camera processor 20 offers a programmatical way to change brightness, but it also has an exposure setting that is purely automatic and changes depending on both the lighting and the brightness setting. The adaptive optics subroutine starts at a low brightness setting and steps through increasing brightness values at intervals. It waits for the auto exposure to respond at each interval. Once the brightness reaches a certain point, the target appears, but shows up very sparsely. At each interval, the code takes note of the width of the detected target and compares it with an expected width, plus or minus a certain tolerance. As the setting gets brighter, the resolution of the image of the target increases, and the width of the target shows up as conforming to the expected width. After some more iterations, the brightness is too bright for the local lighting conditions, and the image is overexposed, causing the detected target width to quickly exceed the expected width including the predefined tolerance. The routine then stops iterating. It takes a running average of the brightness values that produced target widths conforming to the expected width. It then takes that running average and applies an adjustable tuning value to calculate a final brightness value, which it then applies to the camera 16.

Running the adaptive optics routine every time the unit is used removes all human factors and assures that the tracking device 10 functions in all lighting conditions in a factory. In some cases, such as when there is a direct glare in bright sun at angles around 90 degrees, there is no optimal brightness setting and the system may not operate properly. There are two assurances in place so that the operator cannot receive a false measurement. Using the aforementioned expected width and tolerance, an error handling routine is employed. It is highly improbable that a glare or interference can match the expected width of the target. Since the target is also in the image, glare issues almost always add to the detected width, resulting in an overblown target. Therefore, the user will receive an error rather than an erroneous measurement value. Secondly, the attachable optical target 86 (shown in FIGS. 13A and 13B) that clamps to the trailing edge 128 of the rudder 108 has a strip of infrared reflective diffusive tape 94 in the center and wings 96*a* and 96*b* on each side to act as glare shields. Using the attachable optical target 86 may even eliminate the need for the use of the adaptive optics subroutine.

Figure 17:
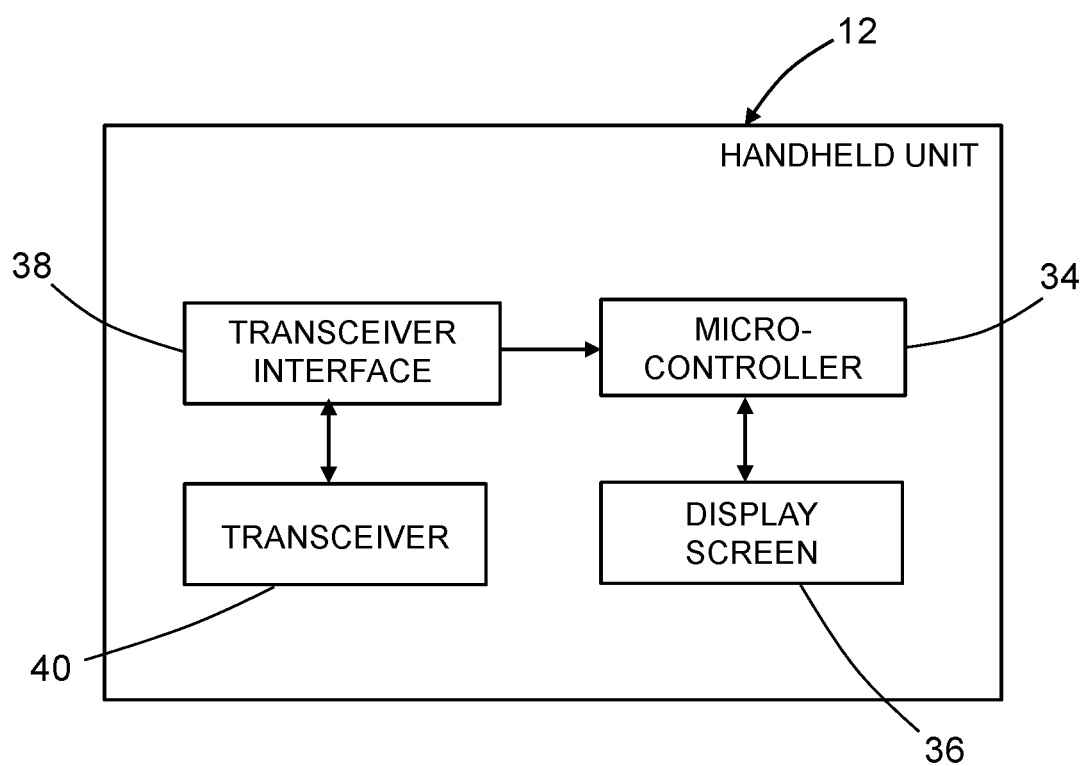
FIG. 17 is a block diagram identifying components of a handheld unit in accordance with one embodiment.

FIG. 17 is a block diagram identifying components of a handheld unit 12 in accordance with one embodiment. The handheld unit 12 comprises a microcontroller 34 on a microcontroller board (not shown) that is disposed inside the housing 42 (see FIG. 11) of the handheld unit 12. The microcontroller 34 also controls the display screen 36. The microcontroller 34 handles all analog and digital inputs and outputs and runs the handheld unit programming. In one implementation, the microcontroller board inside the handheld unit is an Arduino UNO microcontroller board. In addition, the handheld unit 12 incorporates a transceiver interface board 38 and a transceiver 40. The microcontroller 34 communicates with transceiver 40 via transceiver interface board 38. The transceiver 40 may be a 2.4-GHz radio transceiver module capable of wirelessly relaying measurements and commands between the tracking device 10 and the handheld unit 12. In one implementation, the transceiver 40 is an Xbee Pro S1 802.15.4 module, while the transceiver interface board 38 is a Seeedstudio Xbee shield with an SPI pass-through suitable for routing signals between Xbee radios and Arduino microcontroller boards.

As previously described, the display screen 36 displays measurement results received from the tracking device 10 and allows for touch control of the tracking device 10. The microcontroller 34 is configured so that the display screen 36 displays symbology indicating the current position of the control surface relative to its neutral position based on information received from the tracking device 10. This enables a technician to operate the tracking device 10 and read measurements from the flight deck during a control surface rigging operation.

Figure 18:
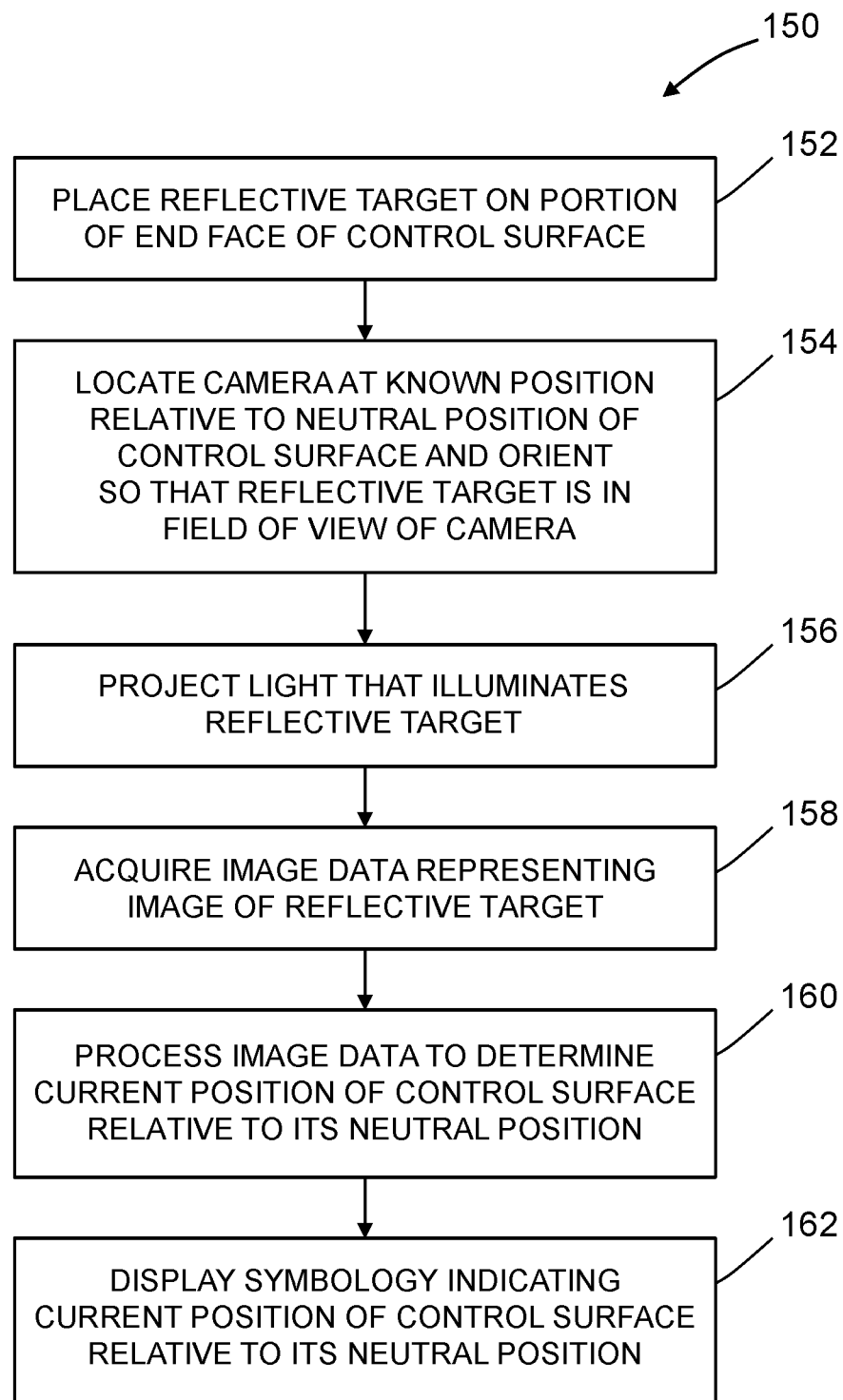
FIG. 18 is a flowchart identifying steps of a method for indicating a position of a control surface that is coupled to a vehicular structure relative to a neutral position of the control surface in accordance with one embodiment.

FIG. 18 is a flowchart identifying steps of a method 150 for indicating a position of a control surface that is coupled to a vehicular structure relative to a neutral position of the control surface in accordance with one embodiment. This method 150 comprising the following steps: placing a reflective target on a portion of an end face of the control surface (step 152); locating a camera at a known position relative to the neutral position of the control surface and oriented so that a field of view of the camera encompasses the reflective target (step 154); projecting light that illuminates the reflective target (step 156); acquiring image data representing an image of the reflective target (step 158); processing the image data to determine a current position of the control surface relative to the neutral position of the control surface (step 160); and displaying symbology indicating the current position of the control surface relative to its neutral position (step 162). In accordance with one embodiment of the method, processing the image data comprises detecting first and second edges of the reflective target and then calculating first and second positions of the first and second edges of the reflective target respectively, the current position of the centerline of the end face of the control surface being midway between the first and second positions.

While optical control surface indication systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more computing systems. As used herein, the term "computing system" comprises one or more of the following: a computer, a processor, a controller, a central processing unit, a microcontroller, a reduced instruction set computer processor, an ASIC, a programmable logic circuit, an FPGA, a digital signal processor, and/or any other circuit or processing device capable of executing the functions described herein. For example, a computing system may comprise multiple microcontrollers or multiple processors which communicate via interfaces, or may comprise a first microcontroller (e.g., on an Arduino microcontroller board) which communicates with a processor (e.g., on an Xbee shield) and with a second microcontroller (e.g., on the camera board).

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

As used herein, the term "location" comprises position in a fixed three-dimensional coordinate system and orientation relative to that coordinate system. As used in the claims, the term "support member" should be construed broadly to encompass a plunger boss and structural equivalents thereof.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A tool assembly comprising an electrical tool and a tool platform that carries the electrical tool, wherein the tool platform comprises:
a base plate having first and second openings;
first and second support members attached to the base plate, each of the first and second support members comprising a first portion disposed in the first and second openings in the base plate respectively and having a bore;
first and second magnets attached to respective second portions of the first and second support members;
first and second plunger cups movable between first and second axial positions in the bore of the respective first portion of the first and second support members;
first and second mounting plates made of ferromagnetic material and having respective portions configured to abut the first and second magnets;
first and second suction cups attached to the first and second mounting plates respectively; and
first and second lanyards each having one end coupled to a respective one of the first and second mounting plates and another end coupled to the base plate.

2. The tool platform as recited in claim 1, further comprising first, second and third balls made of polymeric material and attached to the base plate.

3. The tool assembly as recited in claim 1, further comprising a housing attached to the base plate, the housing comprising a body, a head and a neck connecting the body and head, wherein the electrical tool is disposed inside the head of the housing.

4. The tool assembly as recited in claim 1, wherein the base plate has an opening with an alignment point.

5. The tool assembly as recited in claim 1, wherein the electrical tool comprises an infrared camera.

6. The tool assembly as recited in claim 1, wherein the electrical tool comprises a light-emitting diode.

7. A tool assembly comprising an electrical tool and a tool platform that carries the electrical tool, wherein the tool platform comprises:
a base plate having first and second openings;
first and second plunger bosses attached to the base plate, the first and second plunger bosses comprising respective first portions disposed in the first and second openings in the base plate respectively and having respective bores;
first and second magnets attached to respective second portions of the first and second plunger bosses;
first and second plunger cups movable between first and second axial positions in the respective bores of the respective first portions of the first and second plunger bosses;
first and second mounting plates made of ferromagnetic material and having respective first portions configured to abut the first and second magnets respectively;
first and second suction cups attached to respective second portions of the first and second mounting plates respectively; and first and second lanyards each having one end coupled to a respective one of the first and second mounting plates and another end coupled to the base plate.

8. The tool assembly as recited in claim 7, wherein the tool platform further comprises first, second and third balls made of polymeric material and attached to the base plate.

9. The tool assembly as recited in claim 8, wherein the base plate has first, second and third recesses which receive respective portions of the first, second and third balls respectively.

10. The tool assembly as recited in claim 7, wherein the respective first portions of the first and second plunger bosses are bushing portions.

11. The tool assembly as recited in claim 7, further comprising first and second springs respectively disposed in the respective bores of the respective first portions of the first and second plunger bosses for urging the indexing plunger cups to protrude further out of the bores.

12. The tool assembly as recited in claim 7, wherein the plunger cups are configured to receive respective heads of respective fasteners.

13. The tool assembly as recited in claim 7, further comprising first and second handles respectively attached to the first and second suction cups.

14. The tool assembly as recited in claim 7, further comprising first and second ball knobs respectively attached to the respective second portions of the first and second mounting plates.

15. The tool assembly as recited in claim 7, wherein the second portion of the first mounting plate is angled relative to the first portion of the first mounting plate and the second portion of the second mounting plate is angled relative to the first portion of the second mounting plate.

16. The tool assembly as recited in claim 7, wherein the base plate has an opening with an alignment point.

17. The tool assembly as recited in claim 7, wherein the electrical tool comprises an infrared camera.

18. The tool assembly as recited in claim 7, wherein the electrical tool comprises a light-emitting diode.

19. The tool assembly as recited in claim 7, further comprising a housing attached to the base plate, the housing comprising a body, a head and a neck connecting the body and head, wherein the electrical tool is disposed inside the head of the housing.

20. The tool assembly as recited in claim 19, further comprising a gasket disposed between the housing and base plate.

* * * * *